(12) United States Patent
Stolfo

(10) Patent No.: US 10,063,574 B2
(45) Date of Patent: *Aug. 28, 2018

(54) APPARATUS METHOD AND MEDIUM FOR TRACING THE ORIGIN OF NETWORK TRANSMISSIONS USING N-GRAM DISTRIBUTION OF DATA

(71) Applicant: The Trustees of Columbia University in the City of New York, New York, NY (US)

(72) Inventor: Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/638,705

(22) Filed: Mar. 4, 2015

(65) Prior Publication Data

US 2015/0180895 A1    Jun. 25, 2015

Related U.S. Application Data

(63) Continuation of application No. 13/550,711, filed on Jul. 17, 2012, now Pat. No. 9,003,528, which is a (Continued)

(51) Int. Cl.
*H04L 29/06*  (2006.01)
*H04L 12/26*  (2006.01)
(Continued)

(52) U.S. Cl.
CPC .......... *H04L 63/1425* (2013.01); *G06F 21/55* (2013.01); *G06F 21/552* (2013.01);
(Continued)

(58) Field of Classification Search
CPC ............... H04L 63/1425; H04L 63/029; H04L 43/0876; H04L 63/0218; H04L 12/2602;
(Continued)

(56) References Cited

U.S. PATENT DOCUMENTS 4,621,334 A    11/1986    Garcia
5,440,723 A    8/1995    Arnold et al.
(Continued)

FOREIGN PATENT DOCUMENTS

JP    2003-158551    5/2003
JP    2003-533941    11/2003
(Continued)

OTHER PUBLICATIONS

"2003 International Conference on CYBERWORLDS: Conference Programs", In Proceedings of the 2003 International Conference on Cyberworlds (CW'03), Singapore, Dec. 3-5, 2003, pp. 1-11.
(Continued)

*Primary Examiner* — Darren B Schwartz
(74) *Attorney, Agent, or Firm* — Byrne Poh LLP

(57) ABSTRACT

A method, apparatus, and medium are provided for tracing the origin of network transmissions. Connection records are maintained at computer system for storing source and destination addresses. The connection records also maintain a statistical distribution of data corresponding to the data payload being transmitted. The statistical distribution can be compared to that of the connection records in order to identify the sender. The location of the sender can subsequently be determined from the source address stored in the connection record. The process can be repeated multiple times until the location of the original sender has been traced.

17 Claims, 24 Drawing Sheets

Related U.S. Application Data continuation of application No. 10/986,467, filed on Nov. 12, 2004, now Pat. No. 8,239,687.

(60) Provisional application No. 60/518,742, filed on Nov. 12, 2003, provisional application No. 60/613,637, filed on Sep. 28, 2004.

(51) Int. Cl.
    *G06F 21/55* (2013.01)
    *G06F 21/56* (2013.01)

(52) U.S. Cl.
    CPC ............ *G06F 21/554* (2013.01); *G06F 21/56* (2013.01); *G06F 21/562* (2013.01); *G06F 21/563* (2013.01); *G06F 21/564* (2013.01); *H04L 43/00* (2013.01); *H04L 43/0876* (2013.01); *H04L 63/029* (2013.01); *H04L 63/0218* (2013.01); *H04L 63/0245* (2013.01); *H04L 63/0263* (2013.01); *H04L 63/145* (2013.01)

(58) Field of Classification Search
    CPC . H04L 43/00; H04L 63/0245; H04L 63/0263; H04L 63/145; G06F 21/55; G06F 21/564; G06F 21/552; G06F 21/56; G06F 21/562; G06F 21/563; G06F 21/554
    See application file for complete search history.

(56) References Cited

U.S. PATENT DOCUMENTS

| | | | |
|---|---|---|---|
| 5,452,442 A * | 9/1995 | Kephart | G06F 21/564 713/188 |
| 5,485,575 A | 1/1996 | Chess et al. | |
| 5,675,711 A | 10/1997 | Kephart et al. | |
| 5,761,191 A | 6/1998 | VanDervort et al. | |
| 5,826,013 A | 10/1998 | Nachenberg | |
| 5,835,888 A | 11/1998 | Kanevsky et al. | |
| 5,948,104 A | 9/1999 | Gluck et al. | |
| 5,991,714 A | 11/1999 | Shaner | |
| 6,016,546 A | 1/2000 | Kephart et al. | |
| 6,157,905 A | 12/2000 | Powell | |
| 6,253,337 B1 | 6/2001 | Maloney et al. | |
| 6,321,338 B1 | 11/2001 | Porras et al. | |
| 6,347,374 B1 | 2/2002 | Drake et al. | |
| 6,356,941 B1 | 3/2002 | Cohen | |
| 6,560,632 B1 * | 5/2003 | Chess | H04L 29/06 709/201 |
| 6,587,432 B1 | 7/2003 | Putzolu et al. | |
| 6,651,099 B1 | 11/2003 | Dietz et al. | |
| 6,718,535 B1 | 4/2004 | Underwood | |
| 6,732,149 B1 | 5/2004 | Kephart | |
| 6,785,815 B1 | 8/2004 | Serret-Avila et al. | |
| 6,907,430 B2 | 6/2005 | Chong et al. | |
| 6,944,656 B2 | 9/2005 | Evrard et al. | |
| 6,971,019 B1 | 11/2005 | Nachenberg | |
| 7,023,861 B2 | 4/2006 | Makinson et al. | |
| 7,031,311 B2 | 4/2006 | MeLampy et al. | |
| 7,043,759 B2 | 5/2006 | Kaashoek et al. | |
| 7,054,930 B1 | 5/2006 | Cheriton | |
| 7,086,089 B2 | 8/2006 | Hrastar et al. | |
| 7,100,199 B2 | 8/2006 | Ginter et al. | |
| 7,181,768 B1 | 2/2007 | Ghosh et al. | |
| 7,188,173 B2 | 3/2007 | Anderson et al. | |
| 7,219,239 B1 | 5/2007 | Njemanze et al. | |
| 7,225,468 B2 | 5/2007 | Waisman et al. | |
| 7,237,264 B1 * | 6/2007 | Graham | H04L 63/1416 726/23 |
| 7,246,156 B2 | 7/2007 | Ginter et al. | |
| 7,313,100 B1 | 12/2007 | Turner et al. | |
| 7,315,903 B1 | 1/2008 | Bowden | |
| 7,328,349 B2 | 2/2008 | Milliken | |
| 7,331,060 B1 | 2/2008 | Ricciulli | |
| 7,362,707 B2 | 4/2008 | MeLampy et al. | |
| 7,376,969 B1 | 5/2008 | Njemanze et al. | |
| 7,389,537 B1 * | 6/2008 | Callon | H04L 47/10 713/153 |
| 7,444,679 B2 | 10/2008 | Tarquini et al. | |
| 7,448,084 B1 | 11/2008 | Apap et al. | |
| 7,464,407 B2 | 12/2008 | Nakae et al. | |
| 7,475,426 B2 | 1/2009 | Copeland | |
| 7,506,173 B2 | 3/2009 | Margolus et al. | |
| 7,519,998 B2 | 4/2009 | Cai et al. | |
| 7,564,969 B2 | 7/2009 | Cole | |
| 7,596,807 B2 | 9/2009 | Ptacek et al. | |
| 7,607,170 B2 | 10/2009 | Chesla | |
| 7,639,714 B2 | 12/2009 | Stolfo et al. | |
| 7,644,076 B1 * | 1/2010 | Ramesh | G06F 17/3071 707/999.006 |
| 7,681,235 B2 | 3/2010 | Chesla et al. | |
| 7,805,382 B2 | 9/2010 | Rosen et al. | |
| 7,877,621 B2 | 1/2011 | Jacoby et al. | |
| 7,908,357 B2 | 3/2011 | Goranson et al. | |
| 8,154,987 B2 | 4/2012 | Yavatkar et al. | |
| 8,281,400 B1 * | 10/2012 | Eater | H04L 43/04 705/51 |
| 8,327,442 B2 | 12/2012 | Herz et al. | |
| 8,839,417 B1 | 9/2014 | Jordan | |
| 9,276,950 B2 | 3/2016 | Stolfo et al. | |
| 9,497,203 B2 | 11/2016 | Honig et al. | |
| 9,576,127 B2 | 2/2017 | Stolfo et al. | |
| 2002/0007453 A1 | 1/2002 | Nemovicher | |
| 2002/0129140 A1 | 9/2002 | Peled et al. | |
| 2002/0161763 A1 | 10/2002 | Ye et al. | |
| 2002/0174349 A1 | 11/2002 | Wolff et al. | |
| 2002/0194490 A1 | 12/2002 | Halperin et al. | |
| 2003/0009554 A1 | 1/2003 | Burch et al. | |
| 2003/0014662 A1 | 1/2003 | Gupta et al. | |
| 2003/0026631 A1 | 2/2003 | Takahashi et al. | |
| 2003/0028504 A1 | 2/2003 | Burgoon et al. | |
| 2003/0037136 A1 | 2/2003 | Labovitz et al. | |
| 2003/0065926 A1 | 4/2003 | Schultz et al. | |
| 2003/0084319 A1 | 5/2003 | Tarquini et al. | |
| 2003/0084344 A1 | 5/2003 | Tarquini et al. | |
| 2003/0110396 A1 | 6/2003 | Lewis et al. | |
| 2003/0154399 A1 | 8/2003 | Zuk et al. | |
| 2003/0167402 A1 | 9/2003 | Stolfo et al. | |
| 2003/0182310 A1 * | 9/2003 | Charnock | G06F 17/30716 |
| 2003/0190091 A1 | 10/2003 | Stewart et al. | |
| 2003/0236652 A1 | 12/2003 | Scherrer et al. | |
| 2003/0236995 A1 | 12/2003 | Fretwell | |
| 2004/0003284 A1 | 1/2004 | Campbell et al. | |
| 2004/0024736 A1 | 2/2004 | Sakamoto et al. | |
| 2004/0025044 A1 | 2/2004 | Day | |
| 2004/0047356 A1 * | 3/2004 | Bauer | H04L 63/145 370/401 |
| 2004/0054498 A1 | 3/2004 | Shipp | |
| 2004/0093513 A1 | 5/2004 | Cantrell et al. | |
| 2004/0107361 A1 | 6/2004 | Redan et al. | |
| 2004/0111632 A1 | 6/2004 | Halperin | |
| 2004/0153644 A1 | 8/2004 | McCorkendale et al. | |
| 2004/0176108 A1 | 9/2004 | Misikangas | |
| 2004/0250124 A1 * | 12/2004 | Chesla | G06F 21/552 726/13 |
| 2005/0015624 A1 | 1/2005 | Ginter et al. | |
| 2005/0044208 A1 | 2/2005 | Jones et al. | |
| 2005/0044406 A1 | 2/2005 | Stute | |
| 2005/0108578 A1 | 5/2005 | Tajalli et al. | |
| 2005/0177868 A1 | 8/2005 | Kwan | |
| 2005/0216956 A1 | 9/2005 | Orr et al. | |
| 2005/0249214 A1 | 11/2005 | Peng | |
| 2005/0265331 A1 | 12/2005 | Stolfo | |
| 2005/0281291 A1 | 12/2005 | Stolfo et al. | |
| 2006/0015630 A1 | 1/2006 | Stolfo et al. | |
| 2006/0025988 A1 * | 2/2006 | Xu | G06F 17/275 704/8 |
| 2006/0156402 A1 | 7/2006 | Stone et al. | |
| 2006/0206615 A1 * | 9/2006 | Zheng | H04L 63/0227 709/229 |
| 2006/0212572 A1 * | 9/2006 | Afek | H04L 63/145 709/225 |

(56) References Cited

U.S. PATENT DOCUMENTS

| | | |
|---|---|---|
| 2007/0067438 A1 | 3/2007 | Goranson et al. |
| 2008/0271163 A1 | 10/2008 | Stillerman et al. |
| 2011/0238855 A1 | 9/2011 | Korsunsky et al. |
| 2012/0151590 A1* | 6/2012 | Rihn .................. G06F 21/56 726/24 |

FOREIGN PATENT DOCUMENTS

| | | |
|---|---|---|
| JP | 2005-523539 | 4/2005 |
| WO | WO/2001/089146 | 11/2001 |
| WO | WO/2003/090426 | 10/2003 |

OTHER PUBLICATIONS

"Header", In Microsoft Computer Dictionary, Microsoft Press, May 2002, pp. 1.

"Proceedings of 2001 Workshop on New Security Paradigms: Table of Contents", In Proceedings of the 2001 Workshop on New Security Paradigms (NSPW'01), Cloudcroft, NM, US, Sep. 10-13, 2001, pp. 1-4.

"Proceedings of the 2003 ACM Symposium on Applied computing: Table of Contents", In Proceedings of the 2003 ACM Symposium on Applied Computing, Melbourne, FL, US, Mar. 9-12, 2003, pp. 1-22.

"Recent Advances in Intrusion Detection, 7th International Symposium (RAID '04)", In Lecture Notes in Computer Science, vol. 3224, Sophia Antipolis, FR, Sep. 15-17, 2004, pp. 1-5.

"Workshop on Data Mining on Computer Security", In Proceedings of the IEEE International Conference on Data Mining, Melbourne, FL, US, Nov. 19-22, 2003, pp. 1-79.

Armstrong, D. et al., "Controller-Based Autonomic Defense System", In Proceedings of the 3rd DARPA Information Survivability Conference and Exposition (DISCEX '03), vol. 2, Washington, DC, US, Apr. 22-24, 2003, pp. 21-23.

Canadian Patent Application No. 2,545,916, filed May 12, 2006.

Chow, R. et al., "Authentication in the Clouds: A Framework and its Application to Mobile Users", In Proceedings of the 2010 ACM Workshop on Cloud Computing Security Workshop (CCSW '10), Chicago, IL, US, Oct. 8, 2010, pp. 1-6.

Cole, R.G. et al., "Requirements on Worm Mitigation Technologies in MANETS", In Proceedings of the Workshop on Principles of Advanced and Distributed Simulation (PADS '05), Monterey, CA, US, Jun. 1-3, 2005, pp. 207-214.

Damashek, M., "Gauging Similarity with N-Grams: Language-Independent Categorization of Text", In Science, vol. 267, No. 5199, Feb. 10, 1995, pp. 843-848.

European Patent Application No. 04810752.8, filed May 17, 2006.

European Patent Application No. 13161455.4, filed Mar. 27, 2013.

FILExt, "FILExt—the File Extension Source", last updated Apr. 21, 2016, pp. 1-2, available at: http://filext.com/.

Forrest, S. et al., "A Sense of Self for Unix Processes", In Proceedings of the IEEE Symposium on Security and Privacy (S&P '96), Oakland, CA, US, May 6-8, 1996, pp. 120-128.

Fu, X. et al., "On Countermeasures to Traffic Analysis Attacks", In Proceedings of the IEEE Systems, Man and Cybernetics Society Information Assurance Workshop, West Point. NY, US, Jun. 18-20, 2003, pp. 188-195.

Ghosh, A.K. and Schwartzbard, A., "A Study in Using Neural Networks for Anomaly and Misuse Detention", In Proceedings of the 8th USENIX Security Symposium, Washington, DC. US, Aug. 23-26, 1999, pp. 1-12.

Heberlein, L.T., "Internetwork Security Monitor: An Intrusion-Detection System for Large-Scale Networks", In Proceedings of the 15th National Computer Security Conference, Baltimore, MD, US, Oct. 13-16, 1992, pp. 262-271.

Heberlein, T., "Worm Detection and Prevention: Concept, Approach, and Experience", Technical Report, New Squared Inc., Aug. 14, 2002, pp. 1-7, available at: http://www.bandwidthco.com/whitepapers/compforensics/malware/virus-worms/Worm%20Detection.pdf.

Hoagland, J. and Staniford, S., "SPADE: Silicon Defense", Nov. 2000, pp. 1-4, available at: http://www.silicondefense.com/software/spice.

Huang, Q. et al., "Secure Data Forwarding in Wireless Ad Hoc Networks", In IEEE International Conference on Communcations, vol. 5, May 16-20, 2005. pp. 3525-3531.

Huang, Y. and Lee, W., "A Cooperative Intrusion Detection System for Ad Hoc Networks", In Proceedings of the 1st ACM Workshop on Security of Ad Hoc and Sensor Networks (SASN '03), Fairfax, VA, US, Oct. 2003, pp. 135-147.

International Patent Application No. PCT/US2004/037650, filed Nov. 12, 2004.

International Patent Application No. PCT/US2004/037653, filed Nov. 12, 2004.

International Patent Application No. PCT/US2004/037654, filed Nov. 12, 2004.

International Patent Application No. PCT/US2006/042713, filed Oct. 31, 2006.

International Preliminary Report on Patentability dated Apr. 9, 2009 in International Patent Application No. PCT/US2006/042713.

International Preliminary Report on Patentability dated May 26, 2006 in International Patent Application No. PCT/US2004/037650.

International Preliminary Report on Patentability dated Jun. 15, 2006 in International Patent Application No. PCT/US2004/037653.

International Preliminary Report on Patentability dated Jun. 15, 2006 in International Patent Application No. PCT/US2004/037654.

International Search Report and the Written Opinion of the International Searching Authority dated Mar. 20, 2006 in International Patent Application No. PCT/US2004/037654.

International Search Report and the Written Opinion of the International Searching Authority dated Mar. 21, 2006 in International Patent Application No. PCT/US2004/037653.

International Search Report and the Written Opinion of the International Searching Authority dated Mar. 30, 2006 in International Patent Appiication No. PCT/US2004/037650.

International Search Report and the Written Opinion of the International Searching Authority dated Apr. 9, 2008 in International Patent Application No. PCT/US2006/042713.

Japanese Patent Application No. 2006-539859, filed May 12, 2006.

Japanese Patent Application No. 2010-178509, filed Aug. 9, 2010.

Javitz, H.S. and Valdes, A., "The NIDES Statistical Component: Description and Justification", Technical Report 3131, SRI International, Computer Science Laboratory, Mar. 7, 1994, pp. 1-47.

Knuth, D.E., "The Art of Computer Programming. vol. 1 Fundamental Algorithms", Addison-Wesley. 3rd Ed., Jul. 1997, pp. 1-664.

Kolter, J.Z. and Maloof, M.A., "Learning to Detect Malicious Executables in the Wild", In Proceedings of Tenth ACM SIGKDD International Conference on Knowledge Discovery and Data Mining (KDD '04), Seattle, WA, US, Aug. 22-25, 2004, pp. 470-478.

Konno, T. and Masamichi, T., "Anomaly-Based Intrusion Detection and Prevention by Semantic Evaluation of HTTP Requests", In Institute of Electronics, Information and Communication Engineers (IEIC) Technical Report, Research Report, vol. 103, No. 195, Jul. 18, 2003, pp. 91-96.

Kruegel, C. et al., "Service Specific Anomaly Detection for Network Intrusion Detection", Technical Report TUV-1841-2002-28, Technical University of Vienna, Apr. 30, 2002, pp. 1-9.

Krugel, C. et al., "Service Specific Anomaly Detection for Network Intrusion Detection", In Proceedings of the 2002 ACM Symposium on Applied Computing (SAC '02), Madrid, ES, Mar. 10-14, 2002, pp. 201-208.

Lee, W. and Stolfo, S.J., "A Framework for Constructing Features and Models for Intrusion Detection Systems", In ACM Transactions on Information and System Security, vol. 3, No. 4, Nov. 2000, pp. 227-261.

Lippmann, R. et al., "The 1999 DARPA Off-Line Intrusion Detection Evaluation", In Computer Networks, vol. 34, No. 4, Oct. 2000, pp. 579-595.

(56) References Cited

OTHER PUBLICATIONS

Locasto, M.E. et al., "Collaborative Distributed Intrusion Detection", Technical Report CUCS-012-04, Department of Computer Science, Columbia University, Mar. 8, 2004, pp. 1-18.

Mahoney, M.V. and Chan, P.K., "An Analysis of the 1999 DARPA/Lincoln Laboratory Evaluation Data for Network Anomaly Detection", In Proceedings of the 6th International Symposium Recent Advances in Intrusion Detection (RAID '03), Pittsburgh, PA, US, Sep. 8-10, 2003, pp. 220-237.

Mahoney, M.V. and Chan, P.K., "Learning Models of Network Traffic for Detecting Novel Attacks", Technical Report CS-2002-08, Florida Institute of Technology, Aug. 2002. pp. 1-48.

Mahoney, M.V. and Chan, P.K., "Learning Nonstationary Models of Normal Network Traffic for Detecting Novel Attacks", In Proceedings of the Eighth ACM SIGKDD International Conference on Knowledge Discovery and Data Mining (KDD '02), Edmonton, AB, CA, Jul. 23-26, 2002, pp. 376-385.

Mahoney, M.V., "Network Traffic Anomaly Detection Based on Packet Bytes", In Proceedings of the 2003 ACM Symposium on Applied Computing (SAC '03). Melbourne, FL, US, Mar. 9-12, 2003, pp. 346-350.

McLachlan, G.J., "Mahalanobis Distance", In Resonance, vol. 4, No. 6, Jun. 1999, pp. 20-26.

Notice of Allowance dated Aug. 10, 2009 in U.S. Appl. No. 10/986,447.

Notice of Allowance dated Sep. 5, 2013 in U.S. Appl. No. 12/615,917.

Notice of Allowance dated Dec. 2, 2014 in U.S. Appl. No. 13/550,711.

Office Action dated Feb. 6, 2013 in U.S. Appl. No. 12/615,917.

Office Action dated Feb. 8, 2010 in Japanese Patent Application No. 2006-539859.

Office Action dated Mar. 5, 2009 in U.S. Appl. No. 10/986,467.

Office Action dated Mar. 28, 2011 in European Patent Application No. 04810752.8.

Office Action dated Mar. 28, 2012 in European Patent Application No. 04810752.8.

Office Action dated May 6, 2014 in U.S. Appl. No. 12/092,224.

Office Action dated May 8, 2012 in U.S. Appl. No. 12/092,224.

Office Action dated May 16, 2012 in U.S. Appl. No. 12/615,917.

Office Action dated Jun. 23, 2008 in U.S. Appl. No. 10/986,467.

Office Action dated Jun. 29, 2015 in U.S. Appl. No. 14/146,533.

Office Action dated Jul. 2, 2013 in U.S. Pat. No. 2,545,916.

Office Action dated Jul. 12, 2010 in U.S. Appl. No. 10/986,467.

Office Action dated Jul. 19, 2013 in U.S. Appl. No. 12/092,224.

Office Action dated Aug. 5, 2013 in U.S. Appl. No. 13/550,711.

Office Action dated Aug. 20, 2012 in U.S. Pat. No. 2,545,916.

Office Action dated Sep. 24, 2012 in Japanese Patent Application No. 2010-178509.

Office Action dated Sep. 24, 2014 in U.S. Appl. No. 14/146,533.

Office Action dated Oct. 2, 2012 in U.S. Appl. No. 12/092,224.

Office Action dated Oct. 5, 2009 in U.S. Appl. No. 10/986,467.

Office Action dated Oct. 28, 2008 in U.S. Appl. No. 10/986,447.

Office Action dated Nov. 12, 2009 in U.S. Appl. No. 10/986,432.

Office Action dated Nov. 17, 2015 in U.S. Appl. No. 12/092,224.

Office Action dated Dec. 1, 2014 in U.S. Appl. No. 12/092,224.

Park, K.J. and Ryou, H.B., "Anomaly Detection Scheme Using Data Mining in Mobile Environment", In Proceedings of the 2003 International Conference on Computational Science and its Applications (ICCSA '03), Montreal, CA, May 18-21, 2003, pp. 21-30.

Patwardhan, A. et al., "Secure Routing and Intrusion Detection in Ad Hoc Networks", In Proceedings of the 3rd IEEE International Conference on Pervasive Computing and Communications (PerCom '05), Kauai island, HI, US, Mar. 8-12, 2005, pp. 191-199.

Paxson, V., "Bro: A System for Detecting Network Intruders in Reaf-Time", In Proceedings of the 7th USENIX Security Symposium, San Antonio, TX, US, Jan. 26-29, 1998, pp. 1-18.

Porras, P.A. and Neumann, P.G., "EMERALD: Event Monitoring Enabling Responses to Anomalous Live Disturbances", In Proceedings of the 20th National Information Systems Security Conference (NISSC '97), Baltimore, MD, US, Oct. 7-10, 1997, pp. 353-365.

Roesch, M., "Snort: Lightweight Intrusion Detection for Networks", In Proceedings of the 13th Conference on Systems Administration (LISA '99), Seattle, WA, US, Nov. 7-12, 1999, pp. 229-238.

Schultz, M.G., et al. "MEF: Malicious Email Filter—A UNIX Mail Fiiter that Detects Malicious Windows Executables", In Proceedings of the FREENIX Track: 2001 USENIX Annual Technical Conference, Boston, MA, US, Jun. 25-30, 2001, pp. 245-252.

Sekar, R. et al. "Specification-Based Anomaly Detection: A New Approach for Detecting Network Intrusions", In Proceedings of the 9th ACM Conference on Computer and Communications Security (CCS '02), Washington, DC, US, Nov. 18-22, 2002, pp. 265-274.

Spybot, "FileAlyzer", last updated Oct. 14, 2011, pp. 1-4, available at: http://www.safer-networking.org/en/filealyzer/index.html.

Staniford, S., et al., "Practical Automated Detection of Stealthy Portscans", In Journal of Computer Security, vol. 10, No. 1-2, Jun. 2002, pp. 105-136.

Staniford-Chen, S. and Heberlein, L.T., "Holding Intruders Accountable on the Internet", In Proceedings of the 1995 IEEE Symposium on Security and Privacy, Oakland, CA, US, May 8-10, 1995, pp. 39-49.

Sterne, D. et al., "A General Cooperative Intrusion Detection Architecture for MANETs", In Proceedings of the 3rd IEEE International Workshop on Information Assurance (IWIA '05), College Park, MD, US, Mar. 23-24, 2005, pp. 57-70.

Stolfo, S.J. et al., "A Comparative Evaluation of Two Algorithms for Windows Registry Anomaly Detection", In Journal of Computer Security, vol. 13, No. 4, Jul. 2005, pp. 659-693.

Stolfo, S.J. et al., "Data Mining-Based Intrusion Detectors: An Overview of the Columbia IDS Project", In ACM SIGMOD Records, vol. 30, No. 4, Dec. 2001, pp. 5-14.

Subhadrabandhu, D. et al., "Efficacy of Misuse Detection in Adhoc Networks", In First Annual IEEE Communications Society Conference on Sensor and Ad Hoc Communications and Networks (SECON '04), Santa Clara, CA, US, Oct. 4-7, 2004, pp. 97-107.

Sun, B., et al., "Alert Aggregation in Mobile Ad Hoc Networks"; In Proceedings of the 2nd ACM Workshop on Wireless Senutity (WiSe '03), San Diego; CA, US, Sep. 19, 2003, pp. 69-78.

Supplementary European Search Report dated Oct. 25, 2010 in European Patent Application No. 04810752.8.

Szor, P. and Ferrie, P., "Hunting for Metamorphic", Technical Report, Symantec Corporation, Jun. 2003, pp. 1-23.

Taylor, C. and Alves-Foss, J., "NATE—Network Analysis of Anomalous Traffic Events, A Low-Cost Approach", In New Security Paradigms Workshop (NSPW '01), Cloudcroft, NM, US, Sep. 10-13, 2002, pp. 89-96.

Tryfos, P., "Cluster Analysis", Chapter 15, Methods for Business Analysis and Forecasting: Text and Cases, Wiley, Mar. 14, 2001, pp. 1-23.

U.S. Appl. No. 10/986,432, filed Nov. 12, 2004.
U.S. Appl. No. 10/986,447, filed Nov. 12, 2004.
U.S. Appl. No. 12/092,224, filed Apr. 7, 2011.
U.S. Appl. No. 12/615,917, filed Nov. 10, 2009.
U.S. Appl. No. 60/551,732, filed Mar. 9, 2004.
U.S. Appl. No. 60/676,535, filed Apr. 29, 2005.
U.S. Appl. No. 60/732,019, filed Oct. 31, 2005.
U.S. Appl. No. 60/732,457, filed Nov. 1, 2005.
U.S. Appl. No. 60/778,008, filed Feb. 28, 2006.

Vargiya, R. and Chan, P., "Boundary Detection in Tokenizing Network Application Payload for Anomaly Detection", In Proceedings of the ICDM Workshop on Data Mining for Computer Secunty (DMSEC '03), Melbourne, FL, US, Nov. 19, 2003, pp. 1-15.

Vigna, G. and Kemmerer, R.A.. "NetSTAT: A Network-Based Intrusion Detection System". In Journal of Computer Security, vol. 7, No. 1, Sep. 1999, pp. 37-71.

Vigna, G. et al , "An Intrusion Detection Tool for AODV-Based Ad hoc Wireless Networks", In Proceedings of the 20th Annual Computer Security Applications Conference (ACSAC '04), Tucson, AZ, US, Dec. 6-10, 2004, pp. 16-27.

Wagner, D. and Soto, P., "Mimicry Attacks on Host-Based Intrusion Detection Systems", In Proceedings of the Ninth ACM Conference

(56) References Cited

OTHER PUBLICATIONS on Computer and Communications Security (CCS '02), Washington, DC, US, Nov. 18-22, 2002, pp. 255-264.
Wang, F. et al., "Intrusion Detection for Link State Routing Protocol through integrated Network Management", In the Eighth International Conference on Computer Communications and Networks, Boston, MA, US. Oct. 11-13, 1999, pp. 634-639.
Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.
Wang, K. et al., "Anagram: A Content Anomaly Detector Resistant to Mimicry Attack", Technical Report 020-06, Columbia University, Apr. 7, 2006, pp. 1-24.
Wang, K. et al., "Anomalous Payload-Based Worm Detection and Signature Generation", In Proceedings of the 8th International Symposium on Recent Advances in Intrusion Detection (RAID '05), Seattle, WA, US, Sep. 7-9, 2005, pp. 227-246.
Wolf, B.J., "Distributed Formation of Broadcast Transmission Schedules for Mobile Ad Hoc Networks", In IEEE Military Communications Conference, Oct. 31-Nov. 3, 2004, pp. 1268-1274.
Wu, N. and Zhang, J., "Factor Analysis Based Anomaly Detection", In Workshop on Information Assurance (IAW '03), West Point, NY, US, Jun. 18-20, 2003, pp. 108-115.
Zhuowei, L., et al., "Utilizing Statistical Characteristics of N-grams for Intrusion Detection", In Proceedings of the 2003 International Conference on Cyberworlds (CW '03), Singapore, Dec. 3-5, 2003. pp. 486-493.
Arthur, D., et al., "k-means++ The Advantages of Careful Seeding", In Proceedings of the 18th Annual ACM-SIAM Symposium on Discrete Algorithms (SODA), New Orleans, LA, US, Jan. 7-9, 2007, pp. 1027-1035.
Cisco System, "Inside Cisco IOS Software Architecture", 1st Edition, Cisco Press, Indianapolis, IN, US, Aug. 7, 2000, pp. 1-160.
Cole, R.G., "Initial Studies on Worm Propagation in Manets for Future Army Combat Systems", In Proceedings of Army Science Conference (ASC), Orlando, FL, US, Nov. 29-Dec. 2, 2004, pp. 1-8.
Cretu, G., et al., "Data Sanitization: Improving the Forensic Utility of Anomaly Detection Systems", In Proceedings of the 3rd Workshop on Hot Topics in System Dependability (HotDep'07), Edinburgh, UK, Jun. 25-28, 2007, pp. 1-6.
Dressler, G., et al., "Attack Detection Using Cooperating Autonomous Detections Systems (CATS)", In Wilhelm-Schickard Institue of Computer Science, Computer Networks and Internet, Jan. 2004, pp. 1-15.
Ferrailo, D., et al., "Role-Based Access Control (RBAC): Features and Motivations", In Proceedings of the 11th Annual Computer Security Application Conference, New Orleans, LA, US, Dec. 11-15, 1995, pp. 241-247.
Freudenthal, E., et al., "dRBAC: Distributed Role-based Access Control for Dynamic Coalition Environments", In Proceedings of the 22nd IEEE International Conference on Distributed Computing Systems (ICDCS), Vienna, AT, Jul. 2-5, 2002, pp. 411-420.
Frias-Martinez, V., et al., "Behavior-Based Network Access Control: A Proof-of-Concept", In Proceedings of the 11th Information Security Conference, Taipei, TW, Sep. 15-Sep. 19, 2008, pp. 175-190.
Garcia-Luna-Aceves, J., et al., "Wireless Internet Gateways (WINGs)", In Proceedings of the IEEE Military Communications Conference (MILCOM), Monterey, CA, US, Nov. 1997, pp. 1271-1276.
Ghodosi, H., et al., "Dynamic Threshold Cyptosystems: A New Scheme in Group Oriented Cryptography", In Proceedings of the International Conference on the Theory and Applications of Cryptology (ASIACRYPT'96), Kyongju, KR, Nov. 14-18, 1996, pp. 370-379.
Hartigan, J.A., and Wong, M.A., "A K-Means Clustering Algorithm", In Applied Statistics, vol. 28, No. 1, Jan. 1979, pp. 100-108.

Herzberg, A., et al., "Proactive Secret Sharing or: How to Cope with the Perpetual Leakage", In Advance in Cryptology (CRYPTO), Santa Barbara, CA, US, Aug. 27-31, 1995, pp. 339-352.
Iera et al., "Improving QoS and Throughput in Single and Multihop WLANs Through Dynamic Traffic Prioritization", In IEEE Network, vol. 19, No. 4, Jul. 2005, pp. 35-44, available at: http://ieeexplore.ieee.org/stamp/stamps.jsp?arnumber=1470681.
Kong, J., et al., "Providing Robust and Ubiquitous Security Support for Mobile Ad-Hoc Networks", In Proceedings of the International Conference on Network Protocols (ICNP), Riverside, CA, US, Nov. 11-14, 2001, pp. 1-34.
Leiner, B., et al., "Goals and Challenges of the DARPA GloMo Program", In IEEE Personal Communications, vol. 3, No. 6, Dec. 1996, pp. 34-43.
Leon, E., et al., "Anomaly Detection Based on Unsupervised Niche Clustering with Application to Network Intrusion Detection", In Genetic and Evolutionary Computation (GECCO), Jun. 19-23, 2004, pp. 502-508.
Lin, A., and Brown, R., "The Application of Security Policy to Role-Based Access Control and the Common Data Security Architecture", In Computer Communications, vol. 23, No. 17, Nov. 2000, pp. 1584-1593.
Narasimha, M., et al.,"On the Utility of Distributed Cryptography in P2P and MANETs: The Case of Membership Control", In Proceedings of the 11th International Conference on Network Protocol (ICNP), Atlanta, GA, US, Nov. 4-7, 2003, pp. 336-345.
Nikolaidis et al., "Management Traffic in Emerging Remote Configuration Mechanisms for Residential Gateways and Home Devices", In IEEE Communications Magazine, vol. 43, No. 5, Jun. 2005, pp. 154-162, available at: http://ieeexplore.ieee.org/stamp/stamp.jsp?arnumber=1453438.
Notice of Allowance dated Apr. 3, 2012 in U.S. Appl. No. 10/986,467.
Notice of Allowance dated Oct. 22, 2015 in U.S. Appl. No. 14/146,533.
Office Action dated Feb. 5, 2018 in U.S. Appl. No. 15/587,763.
Office Action dated Dec. 15, 2017 in U.S. Appl. No. 15/017,325.
Orbit, "Orbit Architecture", last updated: Jul. 2016, pp. 1-2, available at: http://www.orbit-lab.org.
Papadopoulous, C., et al., "Cossack: Coordinated Suppression of Simultaneous Attacks", In Proceedings of DARPA Information Survivability Conference and Exposition (DISCEX III), Washington, DC, US, Apr. 22-23, 2003, pp. 1-12.
Parekh, J., et al., "Privacy-Preserving Payload-Based Correlation for Accurate Malicious Traffic Detection", In Large Scale Attack Defense (LASD), Pisa, IT, Sep. 11-15, 2006, pp. 99-106.
Payer, Udo, "State-Driven Stack-Based Network Intrusion Detection System", In Proceedings of the 7th International Conference on Telecommunications, Zagreb, HR, Jun. 11-13, 2003, pp. 613-618.
Portnoy, L., et al., "Intrusion Detection With Unlabeled Data Using Clustering", In Proceedings of ACM CSS Workshop on Data Mining Applied to Security (DMSA-2001); Philadelphia, PA, US, Nov. 5, 2001, pp. 1-25.
Shamir, A., "How to Share a Secret", in Communications of the ACM, vol. 22, No. 11, Nov. 1979, pp. 612-613.
Snort, "Snort Ruleset", last updated: 2016, pp. 1-3, available at: https://www.snort.org/downloads.
Spinosa, E., et al., "OLINDDA: A Cluster-Based Approach for Detecting Novelty and Concept Drift in Data Streams", In Proceedings of the ACM Symposium on Applied Computing, Seoul, KR, Mar. 11-15, 2007, pp. 448-452.
VX Heavens, available at: https://web.archive.org/web/20070429163350/http://vx.netlux.org:80/, captured on: Apr. 29, 2007, pp. 1.
Widmer, G. and Kubat, M., "Learning in the Presence of Concept Drift and Hidden Context", In Machine Learning, vol. 23, No. 1, Apr. 1996, pp. 69-101.
Yi, J.H. and Tsudik, G., "Threshold Cryptography in P2P and MANETs: The Case of Access Control", In Journal of Computer Networks, vol. 51, No. 12, Aug. 2007, pp. 3632-3649.

(56) References Cited

OTHER PUBLICATIONS

Zavrel, J., "An Empirical Re-Examination of Weighted Voting for k-NN", In Proceedings of the 7th Belgian-Dutch Conference on Machine Learning (BeNeLearn'97), Tilburg, NE, Oct. 21, 1997, pp. 139-148.

\* cited by examiner

.LFCR1H0T/2PE3589·AD0stGO*INSx —150

| 1 | 2 | 3 | 4 | 5 | 6 | 7 | 8 | 9 | 10 | 11 | 12 | 13 | 14 | 15 |
|---|---|---|---|---|---|---|---|---|----|----|----|----|----|----|
| . |   | LF | CR | 1 | H | 0 | T | / | 2 | P | E | 3 | 14 | 8 |
| 16 | 17 | 18 | 19 | 20 | 21 | 22 | 23 | 24 | 25 | 26 | 27 | 28 | 29 | 30 |
| 9 | : | A | D | o | s | t | G | O | * | I | N | S | x |   |

170: `et olac/.siLFCRwmnp:rTh□—bgAOH1dxECkPfv;zGUM,()*~2S4Jy3W5FI@6=D_B7KLR9jZN[]8Vq%+?0XQ`

180:

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| e | t |   | o | l | a | c | / | . | s | i | LF | CR | w | m |
| 16 | 17 | 18 | 19 | 20 | 21 | 22 | 23 | 24 | 25 | 26 | 27 | 28 | 29 | 30 |
| n | p | : | r | T | h | DC1 | — | b | g | A | O | H | 1 | d |
| 31 | 32 | 33 | 34 | 35 | 36 | 37 | 38 | 39 | 40 | 41 | 42 | 43 | 44 | 45 |
| x | E | C | k | P | f | v | ; | z | G | U | M | , | ( | ) |
| 46 | 47 | 48 | 49 | 50 | 51 | 52 | 53 | 54 | 55 | 56 | 57 | 58 | 59 | 60 |
| * | ~ | 2 | S | 4 | J | y | 3 | W | 5 | F | I | @ | 6 | = |
| 61 | 62 | 63 | 64 | 65 | 66 | 67 | 68 | 69 | 70 | 71 | 72 | 73 | 74 | 75 |
| D | _ | B | 7 | K | L | R | 9 | j | Z | N | [ | ] | 8 | V |
| 76 | 77 | 78 | 79 | 80 | 81 | 82 | 83 | 84 | 85 | 86 | 87 | 88 | 89 | 90 |
| q | % | + | ? | 0 | X | Q | & |   |   |   |   |   |   |   |

APPARATUS METHOD AND MEDIUM FOR TRACING THE ORIGIN OF NETWORK TRANSMISSIONS USING N-GRAM DISTRIBUTION OF DATA

PRIORITY INFORMATION AND CROSS-REFERENCE TO RELATED APPLICATIONS

This application is a continuation of U.S. patent application Ser. No. 13/550,711, filed Jul. 17, 2012, which is a continuation of U.S. patent application Ser. No. 10/986,467, filed Nov. 12, 2004, which claims priority from U.S. Provisional Application No. 60/518,742, filed Nov. 12, 2003, and U.S. Provisional Application No. 60/613,637, filed Sep. 28, 2004, each of which are incorporated by reference herein in their entireties.

This application is related to U.S. patent application Ser. No. 10/986,432, now abandoned, entitled "Apparatus Method and Medium for Identifying Files Using N-Gram Distribution of Data," U.S. patent application Ser. No. 10/986,447, now U.S. Pat. No. 7,639,714, entitled "Apparatus Method and Medium for Detecting Payload Anomaly Using N-Gram Distribution Of Normal Data," both filed on Nov. 12, 2004, incorporated by reference herein in their entireties.

STATEMENT REGARDING FEDERALLY SPONSORED RESEARCH

This invention was made with United States Government support under agreement number F30602-02-2-0209 awarded by DARPA. The United States Government has certain rights in this invention.

BACKGROUND OF THE INVENTION

Technical Field

The present invention relates to data analysis and, more particularly, to the detection of anomalous data transmissions.

Description of the Related Art

Network computer systems consist of processing sites (e.g., host computers) that exchange data with each other. There are various protocols used by computers to exchange data. For example, TCP/IP is one network protocol that provides the transport of data between computers that are connected by a network. Each host computer is assigned a unique internet protocol (IP) address, and data is exchanged between source IP addresses and destination IP addresses to a destination port on the destination host and from a source port on the source host. A port number corresponds to a particular service or application that "listens" for data sent to it on that port from some remote source host. Some ports are standardized and assigned a typical well-known service. For example, web-based servers are typically assigned port 80 for transmission of web requests delivered via TCP/IP packets with control information according to the hypertext transfer protocol (HTTP) commands the web server expects. TCP/IP transfers such data in the form of "network packets" that consist of the identification of IP addresses, port numbers, control information, and payload. The payload is the actual data expected by the service or application. In the case of web traffic, payload can consist, for example, of GET requests for web pages represented by URL's.

As networks, such as the Internet, become more accessible to users, the amount of data transmitted significantly increases. This presents an opportunity for individuals to cause harm to the computers of unsuspecting users. Worms and viruses, in particular, are well known causes for security breaches in computer systems. These constitute malicious data sent to a service or application that exploits a vulnerability (such as a buffer overflow providing root access to the worm's executable program) that causes the service or application to be disabled, crash, or provide unauthorized privileges to an attacker. Some common examples include the recent Code Red, Nimda, and Sobig worms and viruses. Conventional systems designed to detect and defend systems from these malicious and intrusive events depend upon "signatures" or "thumbprints" that are developed by humans or by semi-automated means from known prior bad worms or viruses. Currently, systems are protected after a worm has been detected, and a signature has been developed and distributed to signature-based detectors, such as a virus scanner or a firewall rule.

In order to reduce the potential threat of attacks, a firewall is established to protect computers within a network. Firewalls are computer systems that typically stand at the gateway of a computer network or that reside on a network in front of a critical host or server computer, and which inspect the traffic to and from the network or server, and determine which traffic may proceed, and which traffic will be filtered. Firewalls can also be implemented in the form of software on individual computers. As an example, propagating worms are typically filtered by firewalls that have been preloaded with a "signature rule" that detects the appearance of a specific worm. When a packet and its payload "matches" a known signature string associated with a worm, the firewall would block the TCP/IP packets that delivered the worm, preventing the server from being attacked by that worm.

This approach suffers two fundamental problems. First, the signature strings associated with worms can only be constructed after the worm has been detected. This means the worm was actually not detected on its first appearance, and logically attacked at least one server, causing damage to the server. Protection is not possible until a third party has constructed a signature string and deployed it broadly to all network sites and firewalls. Precious time can be lost during this process, which can typically require many days. During this time, the worm would have successfully spread widely throughout the internet, damaging many thousands if not millions of hosts. This is because worms in particular propagate rapidly on the Internet and infect and destroy systems at very high speeds. Second, there are very many worms that have appeared on the internet, and each of these have had distinct signature strings constructed for their detection which are each loaded into all of the firewalls. This implies that over time firewalls must grow in complexity in order to store, process, and match many signature strings to each packet payload delivered to the gateway or server.

Various attempts have been made to detect worms by analyzing the rate of scanning and probing from external sources which would indicate a worm propagation is underway. Unfortunately, this approach detects the early onset of a propagation, and by definition, the worm has already successfully penetrated a system, infected it, and started its damage and propagation.

Based on the foregoing, it would be beneficial to provide a system capable of detecting potentially harmful data being transmitted through a network. It would also be beneficial to provide a system capable of determining whether potentially harmful data is a malicious program. It would be further beneficial to provide signatures to filter malicious programs such as worms and viruses upon an initial appearance of such programs.

SUMMARY OF THE INVENTION

These and other needs are addressed by the present invention, wherein potentially harmful data being transmitted through a network can be detected. One or more embodiments of the present invention utilizes statistical analysis of data contained in a payload in order to determine whether the payload is potentially harmful. The statistical analysis can be in the form of a byte value distribution of the data contained in the payload. Data transmitted through the network is compared to a model of "normal" data previously received by the network in order to determine its likelihood of being harmful. The normal data received by the network can be determined by modeling traffic received over a set time period. Thus, the normal data represents the regular flow of traffic through the network and, therefore, can include good data, potentially harmful data, and noise. This normal data can then be collected and processed to create a model statistical distribution that is compared to the statistical distribution of newly received data.

According to one or more embodiments of the present invention, a method is provided for detecting anomalous payloads transmitted through a network. The method comprises the steps: receiving at least one payload within the network; determining a length for data contained in the at least one payload; generating a statistical distribution of data contained in the at least one payload received within the network; comparing at least one portion of the generated statistical distribution to a corresponding portion of a selected model distribution representative of normal payloads transmitted through the network; wherein the selected model payload has a predetermined length range that encompasses the length for data contained in the at least one payload; and identifying whether the at least one payload is an anomalous payloads based, at least in part, on differences detected between the at least one portion of the statistical distribution for the at least one payload and the corresponding portion of the model distribution.

According to one or more implementations, the differences between the statistical distribution of the at least one payload and the model distribution are determined based on a distance metric between the two. The distance metric can optionally be calculated based on various techniques including, for example, a Mahalanobis distance. Other implementations of the invention are capable of determining whether an anomalous payload is a worm or virus. Signatures can optionally be generated for any payloads determined to be a worm or virus.

According to one or more embodiments of the present invention, a method is provided for modeling payload data received in a network. The method comprises the steps of: receiving a plurality of payload data in the network; creating a payload length distribution for all payload data received; partitioning the payload length distribution into a plurality of payload ranges; generating a statistical distribution for each received payload data; and constructing a model payload for each payload range based on the statistical distributions of all received payload data encompassed by the payload length range.

According to at least one specific implementation, the model payload is constructed based on the most recently received, or current, payload data. Also, one or more implementations of the present invention can automatically detect when sufficient payload data has been collected to construct the model payload.

There has thus been outlined the more important features of the invention and several, but not all, embodiments in order that the detailed description that follows may be better understood, and in order that the present contribution to the art may be better appreciated. There are, of course, additional features of the invention that will be described hereinafter and which will form the subject matter of the appended claims.

In this respect, before explaining one or more embodiments of the invention in greater detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These, and various features of novelty which characterize the invention, are pointed out with particularity in the appended claims forming a part of this disclosure. For a better understanding of the invention, its operating advantages and the specific benefits attained by its uses, reference should be had to the accompanying drawings and preferred embodiments of the invention illustrating the best mode contemplated for practicing the invention.

BRIEF DESCRIPTION OF THE DRAWINGS

FIG. 6A is an example payload signature Z-string corresponding to the data in FIG. 5A.

FIG. 6B is an example payload signature Z-string corresponding to the data in FIG. 5B.

DETAILED DESCRIPTION OF THE INVENTION

Figure 1:
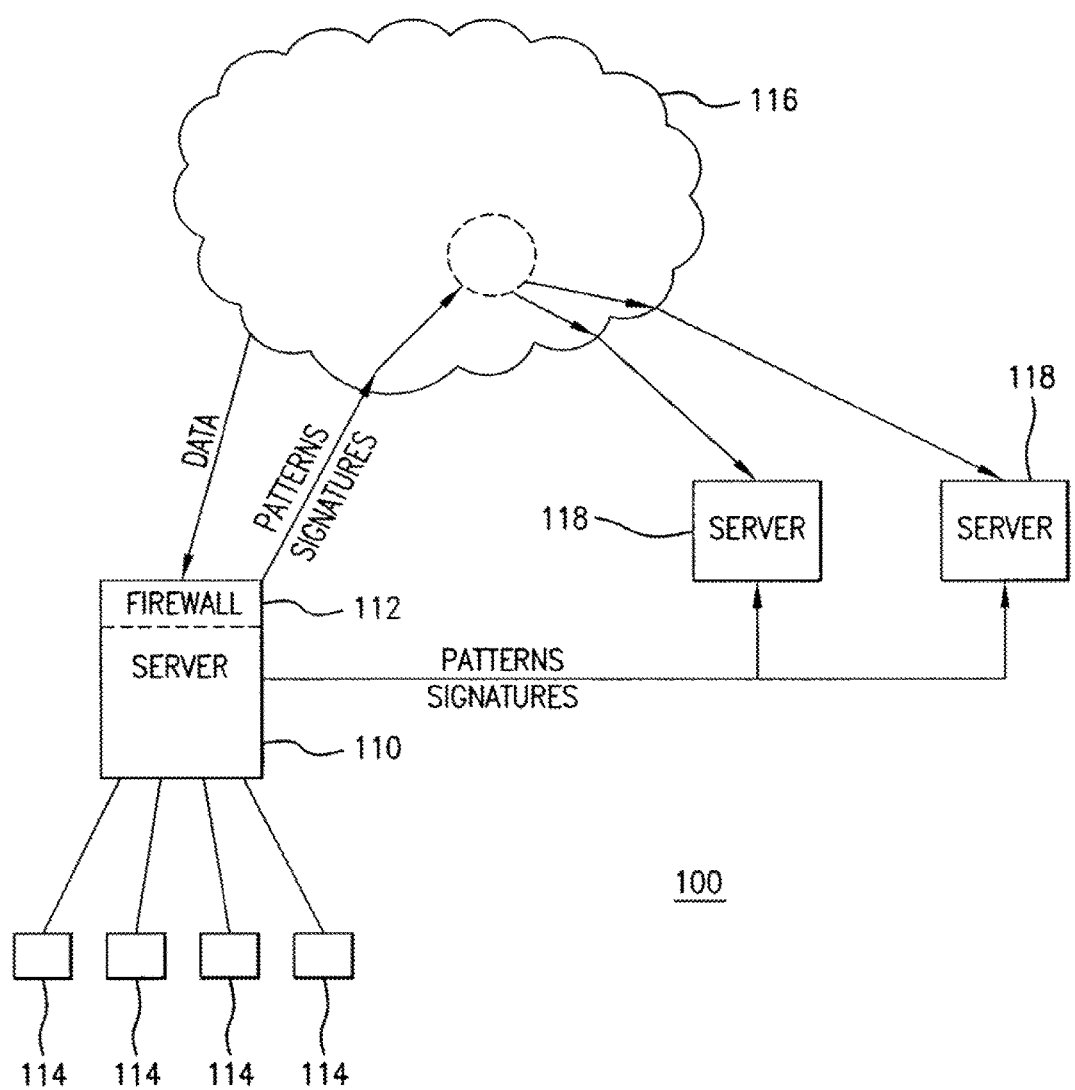
FIG. 1 is a block diagram conceptually illustrating a system for detecting anomalous payloads in accordance with at least one example embodiment of the present invention.

Reference now will be made in detail to one or more embodiments of the invention. Such embodiments are provided by way of explanation of the invention, which is not intended to be limited thereto. In fact, those of ordinary skill in the art will appreciate, upon reading the present specification and viewing the present drawings, that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Prior to describing the details of the invention, a brief discussion of some of the notations and nomenclature used in the description will be presented. Next, a description of example hardware useable in practicing the invention will be presented.

NOTATIONS AND NOMENCLATURE

The detailed descriptions which follow may be presented in terms of program procedures executed on a computer or network of computers. These procedural descriptions and representations are a means used by those skilled in the art to effectively convey the substance of their work to others skilled in the art. In order to execute such procedures, it may be necessary to retrieve information from one or more external sources or input devices. Information can also be retrieved from various storage devices that can be either internally or externally located. Upon completion of the execution phase, information may be output to various sources such as a display device, magnetic storage device, non-volatile memory devices, volatile memory, and/or printers. The information can further be transmitted to remotely located devices using various communication methods and networks such as wired, wireless, satellite, optical, etc.

The term "computer-readable medium" as used herein refers to any medium that participates in providing instructions to a processor for execution. Such a medium may take many forms, including but not limited to, non-volatile media, volatile media, and transmission media. Non-volatile media include, for example, optical or magnetic disks. Volatile media include dynamic memory installed in the computer. Transmission media can include coaxial cables, copper wire, and fiber optics. Transmission media can also take the form of acoustic or light waves, such as those generated during radio frequency (RF) and infrared (IR) data communications. Common forms of computer-readable media include, for example, hard disk, magnetic tape, any other magnetic medium, a CD-ROM, DVD, any other optical medium, a RAM, a PROM, and EPROM, a FLASH-EPROM, any other memory chip or cartridge, a carrier wave as described hereinafter, or any other medium from which a computer can read.

Overview of Payload-Based Anomaly Detection

The present invention has, as at least one goal, to analyze payload data received in a network. The analysis can be used for various purposes including, for example, modeling the normal flow of traffic through the network. One or more embodiments of the present invention allow for detecting the first occurrence of a worm at a network system gateway, and preventing it from entering in the first place. Thus, the worm can be prevented from engaging in its destructive actions and its propagation. Rather, one or more embodiments of the present invention perform, in part, analysis and modeling "normal" payloads that are expected to be delivered to a network service or application.

In one or more embodiments, the present invention includes a "learning" phase that gathers "normal" payloads, produces an n-gram (or "byte value") statistical distribution of those payloads, which serves as a model for "normal" payloads. The payloads gathered are not necessarily safe payloads. Rather, these payloads represent information transmitted through the network during a regular period of time. This is referred to as a model payload. After this model payload has been produced in the learning phase, an anomaly detection phase begins. The anomaly detection phase captures incoming payloads to the network service/application. The incoming payload is tested to determine differences from the model payload. This can be done, for example, by testing the payload for its consistency (or distance) from the model payload. In one or more embodiments of the present invention, a "centroid" is calculated for all the payload data that has been collected during the learning phase. The centroid model then functions as a model payload for detecting anomalous payloads.

According to one or more embodiments of the present invention, any payload determined to be too different from the normal (e.g., expected) payload is deemed anomalous and filtered or otherwise trapped from being sent to the service/application. This can prevent potential infestation if the payload is subsequently determined to be a worm or virus. The level of tolerance allowed can be set by the user, or automatically set based on predetermined criteria. In one or more embodiments of the present invention, the centroid model can be computed based on the byte frequency count distribution of the set of "normal" payloads analyzed during the learning (or training) phase. At least one of the distance metrics that can be used is the Mahalanobis distance metric. In one or more embodiments of the present invention, the Mahalanobis distance can be applied to a finite discrete histogram of byte value (or character) frequencies computed in the training phase. There are numerous engineering choices possible to implement the techniques of the present invention into a system and integrate the detector with standard firewall, application proxy firewalls, or other network-based or host-based computer security technology to prevent the first occurrence of a worm from entering a secured network or host system. The anomaly detection system of the present invention can be based on the statistical distribution of byte values in the network connection's payload. According to one or more embodiments of the present invention, a profile can be built for the normal connection's payload which is specific to the site and port, and then used to detect any significant departure of the new connection's payload as possible malicious attack.

As a first step, payloads that have passed through firewalls and have been delivered to host services and ports can be gathered via an archive (or log) or audited in real time. This data (i.e., the received payloads) constitutes the training data from which a normal model (or model payload) is derived. The set of payloads can have a wide range of lengths depending, for example, upon the amount of data delivered to the service.

As a second step, the distribution of payload lengths of the connections can be modeled and the length distribution partitioned into multiple ranges. Generally, the length of the connections can vary across a very large range, e.g., from a few bytes to millions of bytes. Different length ranges, therefore, can have different types of payload. For example, the short HTTP connections usually contains letters and digits, and very long HTTP connections often contains pictures, video clips, executable files etc, which contain a lot of nonprintable characters. Thus, according to one aspect of the present invention, payload models can be built for different connection length ranges. This can have advantages over building only one model for all the connections.

According to one or more embodiments of the present invention, the distribution of the connection length can be modeled without any prior assumptions through the use of kernel estimates. Kernel estimates smooth out the contribution of each observed data point over a local neighborhood of that point. Probability curves can be generated for the incoming/outgoing HTTP connections. The probability curves can be divided according to accumulative probability values. The high probability ranges will have small bin sizes, while the low probability ranges will have large bin sizes.

Additionally, there are other techniques that can be used to partition the length ranges. For example, clustering algorithms of various sorts can be used, whereby the distance metrics employed can be based upon distance metrics applied to n-gram character distributions as described more fully below. Once the length distribution has been divided into specific ranges, the training data of normal payloads is partitioned into disjoint subsets of payloads that have lengths defined by the partition. For example, if a length partition identifies one range as 0-50, then all payloads of length bounded by 50 bytes will be partitioned into this subset of payloads.

The next step involves modeling all of the normal payloads within each length range. For those connections whose length is within some length range, the average byte frequency count can be computed for ASCII bytes 0-255. This single byte frequency distribution is called a 1-gram distribution. Distributions can also be built for 2-gram (two consecutive bytes), 3-gram (three consecutive bytes) etc. Furthermore, the frequency distribution can be mixed-gram, meaning that a mixture of, for example, 1-gram and 2-gram distributions is used. As used herein, a mixed-gram distribution is a mixture of different size n-gram models within the data. Examples of other mixtures can include, without limitation: 1-gram and 3-gram; 1-gram and 4-gram; 2-gram and 3-gram; 2-gram and 5-gram; 3-gram and 4-gram; 3-gram and 7-gram; 1-gram, 3-gram, and 4-gram; 1-gram, 5-gram, 7-gram, 3-gram; 2-gram, 5-gram, 3-gram, 4-gram; etc. Virtually any mixture can be used. Using 1-gram as an example, if the character frequency is ordered from highest to lowest, it is usually similar to a Zipf distribution, with a long tail.

At least one technique (but not the only technique) for detecting an anomalous payload is to determine whether any character or byte value appears in the payload in question at a frequency of occurrence many times larger or smaller than what would be expected from the observed training data. Such character frequency together with each byte's variance can characterize the payload within some range. Another way to represent it is using a "normal payload signature string", which is the corresponding ASCII byte string of the above ordered frequency distribution, where the characters or byte values that have a zero frequency are ignored. Obviously if the variance of each byte is considered, a "neighborhood of normal payload signature strings" can be obtained, which means each byte has a neighborhood containing several other bytes that can be possibly ordered in that place if the variance is considered in addition to the averaged frequency.

New payloads can be tested to detect how far they depart from the normal model. This can be done, for example, by comparing the new payload's byte frequency distribution to the normal payload model. Once the profile is built, there are multiple ways to compare some new connection's payload against the profile to detect any large difference or departure. Mahalanobis distance metric is one of those distance functions that compute the similarity between two frequency distributions.

The formula of Mahalanobis distance is $D(h_1, \bar{h}) = (h_1 - \bar{h})^T A(h_1 - \bar{h})$, where $\bar{h}$ is the profile feature vector computed from a previous training phase. The Covariance matrix B, $b_{ij} = Cov(\bar{h}_i, h_j)$, and $A = B^{-1}$. Assuming the bytes are statistically independent, the matrix B will become diagonal and the elements are just the variance of the average frequency of each byte. To make the computation simple and fast, the simplified Mahalanobis distance may be derived as $D(h_1, \bar{h}) = \sum_{i=0}^{n-1} (h_1[i] - \bar{h}[i])/\bar{\sigma}_i$, where n equals 256 if 1-gram is used. If this method is applied to the frequency distribution of 2-grams, there would be $n = 256^2$ or 65,536 bins. Various methods can be used to significantly reduce this number. In general, the computation will be linear in the length of the connection payload being tested.

Modeling Payload Data

Referring to the drawings, and initially to FIG. 1, a system 100 is shown for detecting anomalous payloads according to one or more embodiments of the present invention. The payload detection system 100 of FIG. 1 includes a server 110 that receives data (e.g., payloads or payload data) from external sources such as, for example, the Internet 116. The server 110 can also include a firewall 112 that assists in protecting the server 110 from potential attacks. The firewall 112 functions to filter certain data in order to reduce the possibility of viruses and worms being transmitted to the server 110 from the Internet 116. The server 110 can also be coupled to one or more workstations 114 and/or other servers 118. The workstations 114 connect to and interact with the Internet 116 through the server 110. More particularly, each workstation 114 transmits data to the server 110, and the server 110 subsequently transmits this data to a destination via the Internet 116. Data from various sources can be received by the server 110 and filtered through the firewall 112. Once the data has been filtered, the server 110 forwards the data to the workstations 114 in order to facilitate interaction with remotely located devices.

The server 110 generates a statistical distribution for payload data received from the network (or Internet 116), as discussed in greater detail below. The server 110 can store a plurality of model distributions (i.e., model payloads) that represents, or correspond to, the statistical distributions of normal payloads received by the server 110. The statistical distribution of new payload data received by the server 110 is compared to a selected model payload. The model payload is selected, at least in part, based on the size of the current payload data received by the server 110. For example, if the current payload data received by the server 110 is 256 bytes, then the model payload selected by the server 100 will at least include a range that encompasses 256 bytes.

The server 110 compares the distributions in order to identify anonymous payloads. Typically, an anomalous payload will have certain differences in its statistical distribution from the model payload. According to one or more embodiments of the present invention, the server 110 is capable of further processing the anomalous payloads or data in order to determine if they correspond to malicious programs such as, and without limitations, worms or viruses. If a worm or virus is detected, the server 110 can optionally generate a virus pattern or worm signature that can be used to protect itself and other machines. For example, according to one or more embodiments of the present invention, when the server 110 detects and generates a virus pattern (or worm signature), it automatically updates the rules for the firewall 112 so that the identified virus or worm will be filtered if further transmitted from the Internet 116, or other networks. Other (or overlapping) embodiments of the present invention allow the server 110 to transmit the virus patterns and worm signatures to other remote servers 118. The remote servers 118 can be connected to server 110 through a secure and/or direct connection as illustrated in FIG. 1. Alternatively, the virus patterns and signatures can be transmitted through the Internet 116 to the remote servers 118. Once the remote servers 118 receive the virus patterns and signatures, they can update their filtering rules so that they can protect themselves and connected devices from malicious applications transmitted over the Internet 116.

According to one or more embodiments of the present invention, multiple servers (e.g., 110 and 118) can use the payload detection system 110 to identify anomalous data. Each individual server (for example, reference numerals 110 and 118) would perform the same techniques to identify anomalous data, and further determine if they correspond to worms or viruses. However, because the servers 110, 118 are remotely located, they are likely to receive different data from the network, Internet 116. Therefore, each server 110, 118 can potentially identify different types of worms or viruses. Further, each server 110, 118 can interact and exchange information regarding virus patterns and worm signatures so that all servers 110, 118 can update their firewall rules to filter the most recently discovered worms or viruses. Furthermore, individual workstations 114 can implement the techniques of the present invention or order to provide another layer of security and/or independently protect themselves.

According to one or more embodiments of the present invention, the server 110 creates the model distribution based on data received through the network 116. For example, the server 110 can implement various techniques to capture, or snoop, data it receives or transmits. This information is tabulated and used to represent the normal flow of data through the network. Accordingly, the normal flow of data can conceivably include noise and/or malicious programs. The server 110 can collect the data for a prescribed period of time and subsequently generate the model distribution of the data that has been collected.

Figure 2:
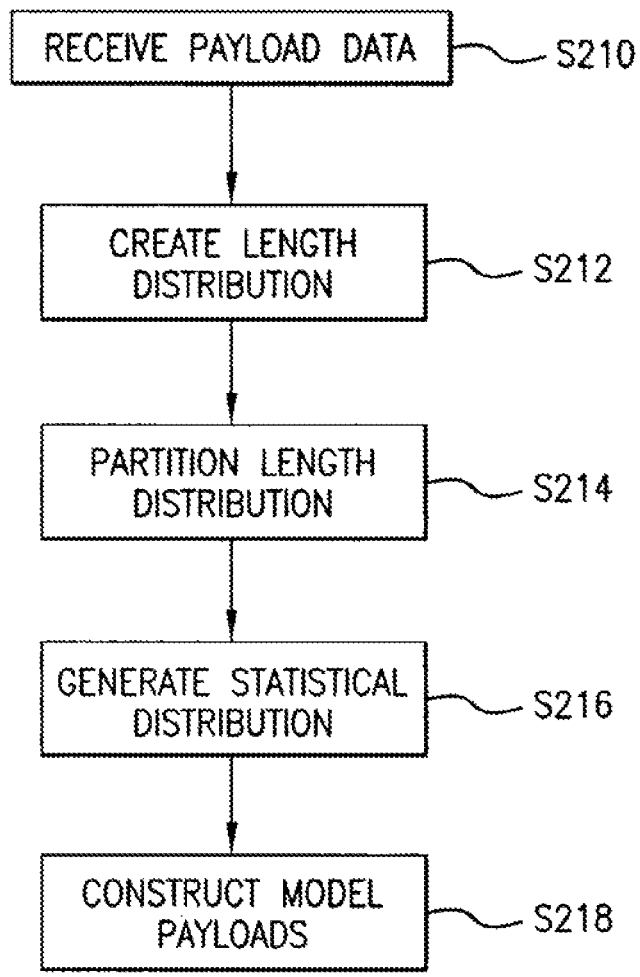
FIG. 2 is a flow diagram illustrating the steps performed to model payload data received in a network according to one or more embodiments of the present invention.

FIG. 2 is a flow diagram illustrating steps performed to generate a model payload according to one or more embodiments of the present invention. These steps can be performed, for example, by the server 110 to generate the model payload that will be compared to payload data received across the network 116. At step S210, the server receives the payload data. The payload data can be received from a plurality of sources including, for example, other networks, the Internet, wireless networks, satellite networks, etc. At step S212, a length distribution is created for the payload data that has been received. It should be noted, however, that the server can continually receive payload data until such time as it has collected a predetermined amount of data sufficient to construct the model payload. The length distribution created by the server at S212 corresponds to the distribution of lengths of individual payloads received by the server during a training period.

Figure 3A:
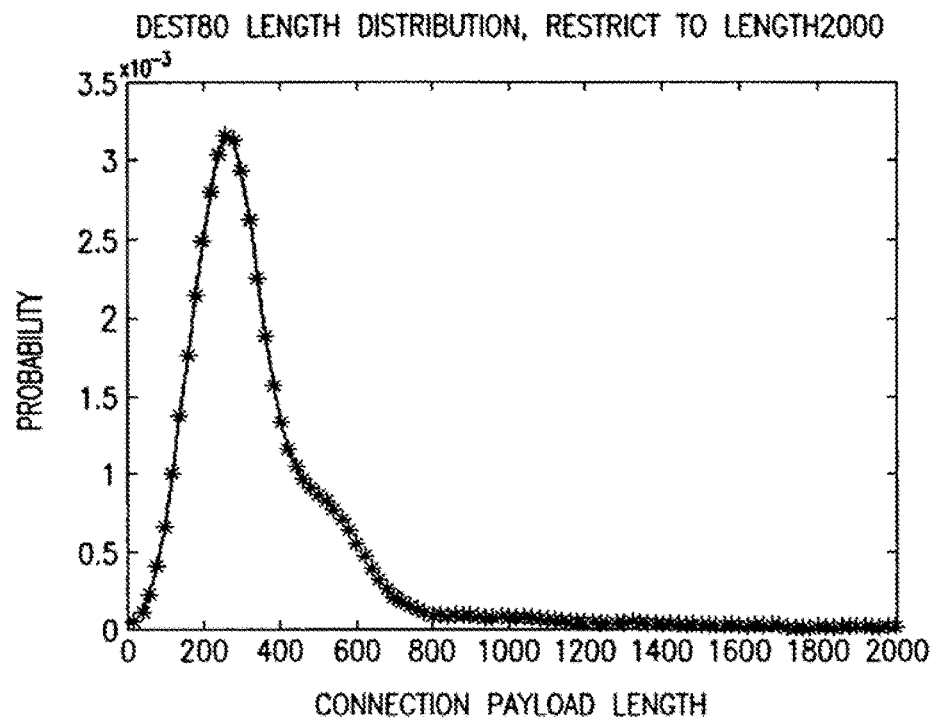
FIG. 3A is a graph illustrating a length distribution for payload data in accordance with one or more embodiments of the present invention.
Figure 3B:
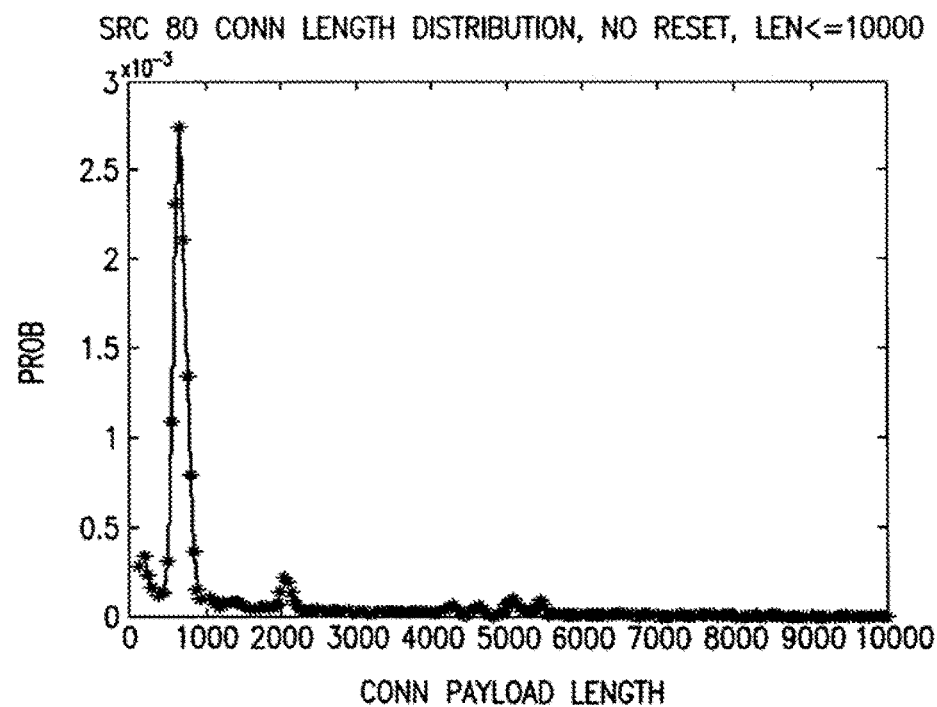
FIG. 3B is a graph illustrating a length distribution for payload data in accordance with one or more embodiments of the present invention.

Referring additionally to FIG. 3A, an example length distribution diagram is shown. The length distribution diagram of FIG. 3A shows the distribution of data received based on the size of the payload. For example, as shown in the FIG. 3A, the number of payloads having a length close to zero is very low. However, the number of payloads having a length that is approximately 200 bytes is significantly higher. As the number of bytes is reduced, the number of payloads having such a length also reduces. This can be attributed to the fact that the majority of data received will correspond to text and/or small files. However, the larger files would correspond to images and/or video or sound files. FIG. 3B illustrates another length distribution of payload data, which ranges from 0 to 10,000 bytes.

Referring back to FIG. 2, at step S214, the length distribution is partitioned. The partitioning process can be done, in part, to generate multiple model payloads that can be selectively compared to received payload data. According to one or more embodiments of the present invention, at least one advantage of partitioning the length distribution is to reduce the amount of time necessary to calculate the difference between the statistical distribution of the received payload compared to the distribution of the model payload. There are various techniques that can be used to partition the length distribution. For example, according to one embodiment of the present invention, at least one clustering algorithm can be used to partition the length distribution. The length distribution can also be partitioned using kernel estimates.

Figure 4:
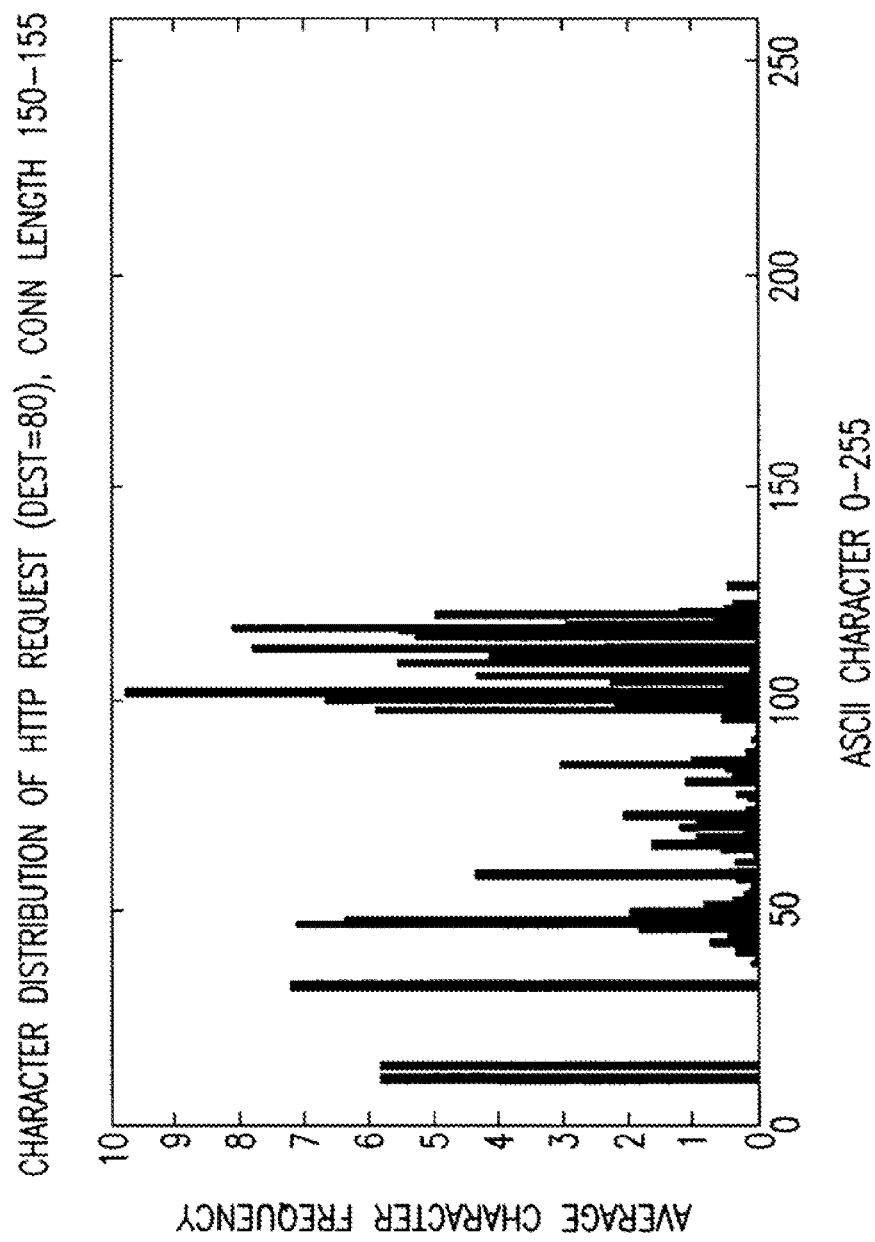
FIG. 4 is a statistical distribution of data contained in example payloads.

At step S216, a statistical distribution is generated for each of the partitions created from the length distribution. The statistical distribution can correspond, for example, to the frequency distribution of ASCII characters (or data)

contained in the payload. Referring additionally to FIG. 4, a statistical distribution of example payloads having a length of 150 to 155 bytes is illustrated. According to the example embodiment of FIG. 4, the statistical distribution corresponds to the byte frequency count of data contained in the payload. For example, the x-axis represents the numerical value of the ASCII character, while the y-axis corresponds to the number of times a particular character occurred in the payload. The y-axis may be normalized corresponding to the percentage of the number of occurrences of a particular character or byte value.

According to one or more embodiments of the present invention, an n-gram technique can be used to group the bytes when generating the statistical distribution. Using such a technique, the variable n corresponds to a particular byte grouping which can take on different values. For example, in a 2-gram distribution, adjacent pairs of bytes would be grouped together as one feature. Similarly, using a 4-gram distribution, 4 adjacent bytes would be grouped as one feature. It should be further noted that one or more embodiments of the present invention can provide for mixed-gram distribution of the payload, as previously described. For example, a portion of the length distribution can be grouped with as 2 bytes, while other portions are grouped as three, or four, etc. Thus, depending on the complexity of the length distribution and/or data received by the server, a mixed-gram distribution can be used to reduce the amount of time necessary to calculate the difference between a received payload data and the model payloads.

Figure 5A:
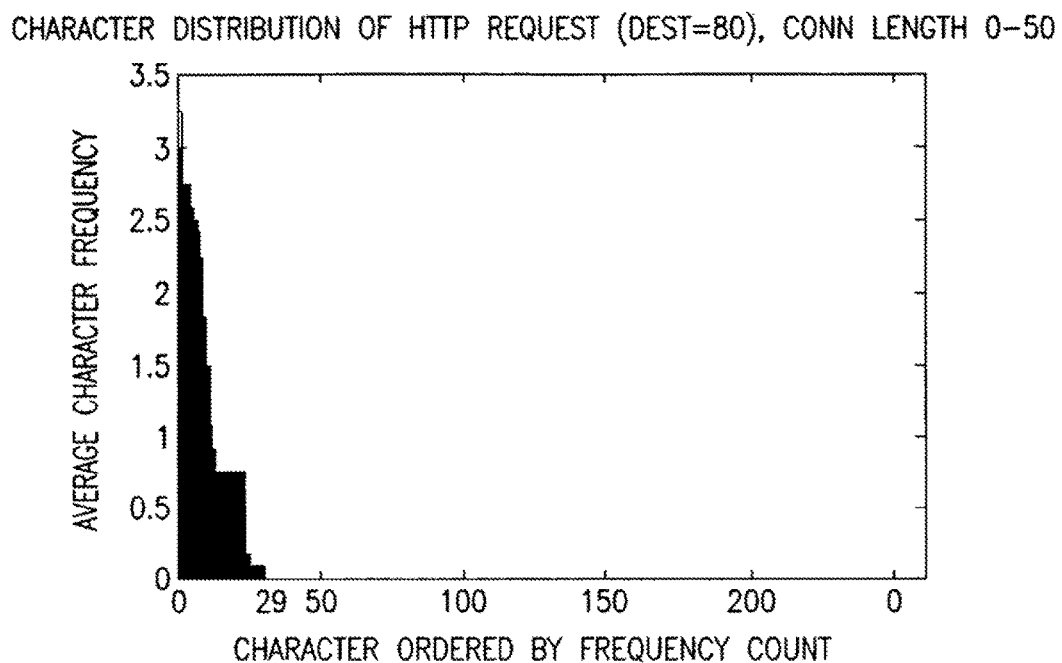
FIG. 5A is a rank ordered byte frequency count of the data contained in payloads.

According to one or more embodiments of the present invention, the statistical distribution can be arranged in various forms. For example, a rank ordered byte frequency count can be generated from the byte value distribution. FIG. 5A illustrates a rank ordered byte frequency count of character distributions. In FIG. 5A, the character, which occurred most frequently, is mapped as character one on the x-axis. The next most frequently received character mapped is character two, etc. Examination of FIG. 5A reveals that not every single ASCII character was contained in the payload data. Accordingly, in the rank ordered byte frequency graph, the right most part of the chart is empty. Furthermore, for the sample connection length and payload data tested for this example, only 29 characters were present.

Figure 5B:
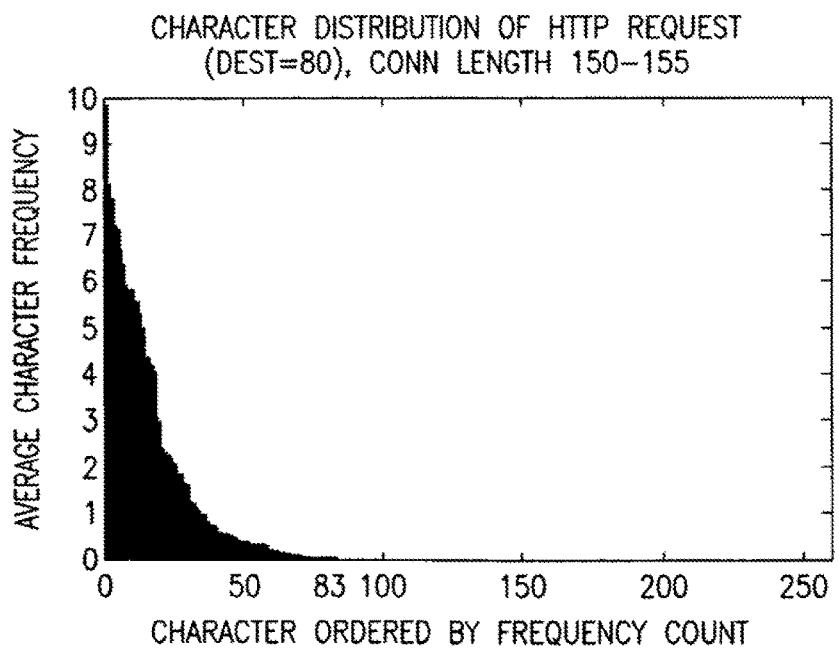
FIG. 5B is a rank ordered byte frequency count of the data shown in FIG. 4.

FIG. 5B illustrates another exemplary rank ordered byte frequency chart for a connection length of 150 to 155 bytes (illustrated in FIG. 4). As can be seen in FIG. 5B, there were more ASCII characters present in the payload data as compared to FIG. 5A. In particular, 83 ASCII characters were present. Thus, the rightmost portion of the graph has no values.

Referring back to FIG. 2, at step S218, the model payload (s) is constructed. Depending on the number of partitions generated, a corresponding number of model payloads would be constructed. For example, if the length distribution were partitioned into 20 sections, there would be 20 separate model payloads constructed. According to one or more embodiments of the present invention, each model payload can be generated in the form of a payload signature string.

Referring to FIG. 6A, an example payload signature "Z-string" 150 corresponding to the rank ordered byte frequency count of FIG. 5A is shown. The payload signature Z-string is a string value formed directly from the statistical distribution data representing the particular byte values in order of frequency, from highest to lowest. Further, the payload signature Z-strings of the present invention can have different lengths depending on the content of the data. As shown in FIG. 6A, the payload signature string 150 includes plurality of ASCII characters. Table 160 illustrates in further detail, the data corresponding to which characters occurred with the highest frequency. As can be seen from FIG. 6A, the table only includes 29 entries. This value corresponds to the number of characters that occurred for the sample connection length.

FIG. 6B illustrates an example payload signature string for the rank ordered frequency chart of FIG. 5B. The signature string 170 is also shown with the corresponding table containing the values of each character from the graph. Similar to FIG. 6B, only 83 entries are present in the table 180. This value again corresponds to the graph in FIG. 5B.

Once the model payloads have been constructed, the server compares each received payload data with the model payloads in order to identify anomalous payloads. Further, as previously indicated, the received payload data is compared to a model payload, which corresponds to the length of the payload data. For example, if a received payload data had a length of 40 bytes, it would be compared to a payload signature string such as that of FIG. 6A. Likewise, if the received payload data has a length of 153 bytes, it would be compared to a payload signature string such as that of FIG. 6B.

Figure 7:
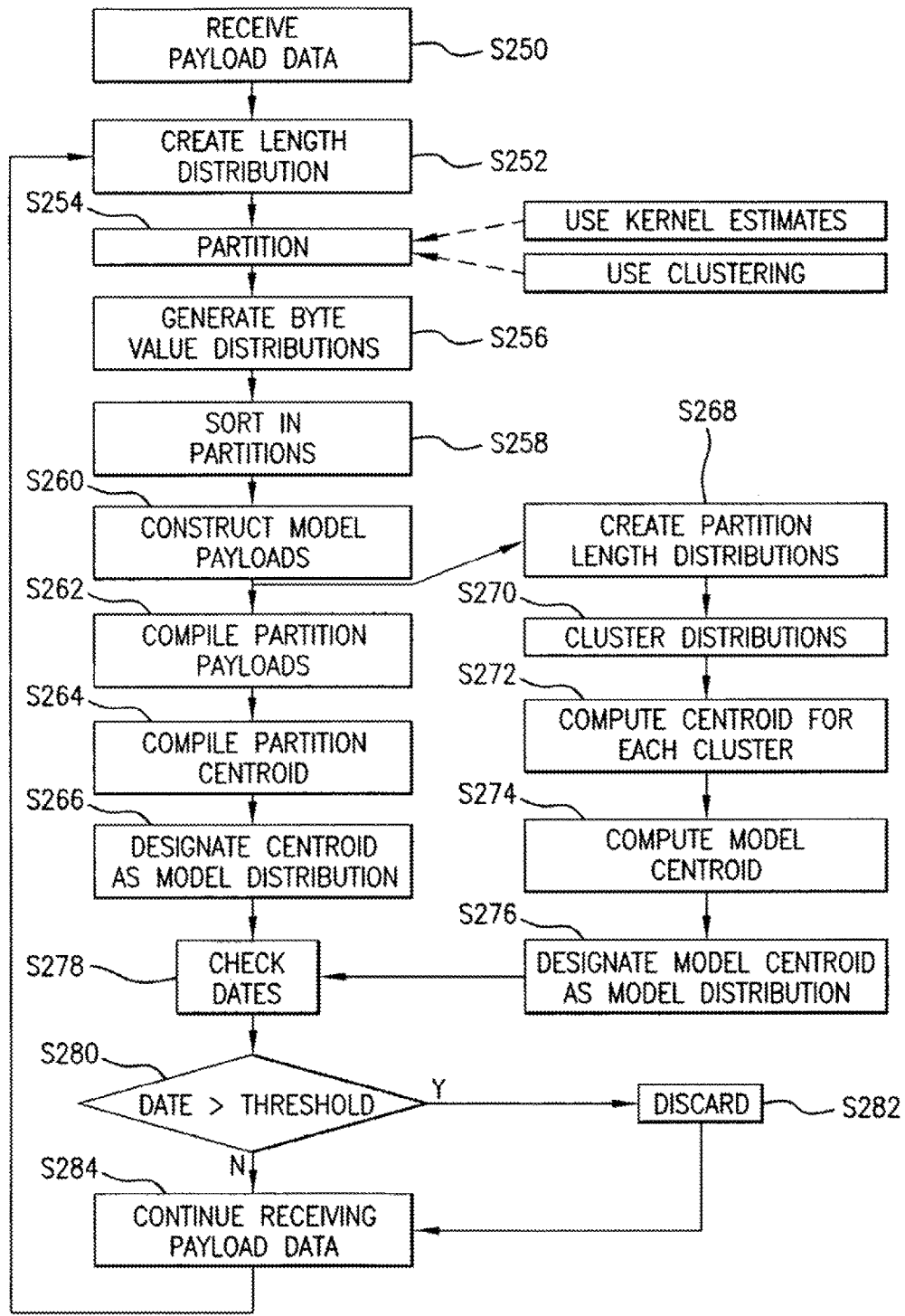
FIG. 7 is a flowchart illustrating the steps performed to model payload data in accordance with one or more embodiments of the present invention.

Turning now to FIG. 7, a flowchart is illustrated for constructing model payloads according to one or more embodiments of the present invention. At step S250, payload data is received. This corresponds to the server receiving data through the network. At step S252, a length distribution is created for the payload data. As previously discussed, the server will receive a plurality of payload data sufficient to create model payloads. Once the plurality of payload data has been received, the length distribution can be created. Alternatively, a minimum amount of data can be received by the server, and the length distribution can be initially created based on this data. As data is received, the length distribution would be continually updated and the model payloads constructed would be refined to better reflect the type of data currently being received through the network.

At step S254, the length distribution is partitioned into a plurality of portions. As previously discussed, the length distribution can be partitioned using kernel estimates and/or various clustering techniques. At step S256, a byte value distribution is created for each partition. At S258, the payload data is sorted into the different partitions. For example, if one of the partitions corresponds to payload data having a length of 0 to 50 bytes, then any individual payload data that fall within that range would be sorted into that particular partition. At S260, a model payload is constructed for each partition.

According to one or more embodiments of the present invention, various techniques can be applied to construct and/or refine the model payloads. For example, as illustrated in FIG. 7, the payload data contained in each partition can be compiled at step S262. This corresponds to a step where all of the payload data in the partition is combined for further processing. Once the payloads in the partitions are compiled, a centroid is computed for each partition at step S264. The centroid can be computed using any of a plurality of computation techniques. At step S266, the centroid is designated as the model payload. Accordingly, using this method of refining the model payload, the centroid (i.e., newly designated model payload) would be used to determine whether incoming payload data is anomalous.

Alternately, at step S268, a plurality of partition length distributions are created. A partition length distribution is simply the distribution of the data within the partition as previously discussed. Once the partition length distribution is created, the data is clustered at step S270 to generate a plurality of cluster distributions. At step S272, a centroid is computed for each cluster that has been generated. At step S274, a model centroid is computed. According to one or more embodiments of the present invention, the model centroid computed at step S274 corresponds to the centroid of all the cluster centroids that were computed at step S272. Accordingly, the model centroid is the centroid of a plurality of centroids. At step S276, the model centroid is designated as the model distribution. Thus, incoming data would be compared to the model centroid in order to determine anomalous payloads that could potentially be a malicious program.

According to one or more embodiments of the invention, the clustering algorithm used in conjunction with step S270 can be a real-time, incremental algorithm, and it may not be necessary to specify the number of clusters in advance. An initial number of clusters, K, can be set to correspond to the maximum possible clusters number allowable. For example, a value of K=10 may be sufficient to represent the number of different kinds of network payload traffic. A new payload that is analyzed during the training phase can be used to update the statistics of a previously computed centroid which is most similar to the new payload. If there are no centroids yet computed, or no existing centroids that are similar to the new payload, then the new payload is used as a new centroid. If the total number of centroids is greater than K, then the two most similar centroids can be merged by combining their statistics into one distribution. When the training phase is complete, certain centroids can be pruned by only retaining those centroids that were computed with a specified minimum number of training payloads. Such pruning of "under-trained" centroids can assist in the identification of "noise" in the training data which could possibly represent a "bad" payload that would otherwise not be identified during the detection phase.

According to one or more embodiments of the present invention, the server is further capable of aging out data that has been received so that the model distribution being used can accurately reflect the type of data that is currently flowing through the network. For example, at step S278, the server can check the date on payloads that have been received and used to generate the model distribution. At step S280, the server determines if the date of a payload data is greater than, or older than, a predetermined threshold. For example, in order to maintain, or keep the payload profile current, it can be determined that only payload data received within the last six months should be used to construct the model distribution. Based on such an example, a payload data that is older than six months would exceed the threshold. If the date of the payload data exceeds the threshold, then control passes to step S282 where the payload data is discarded. Alternatively, if the date of the payload data does not exceed the threshold value, then the server simply continues receiving payload data at step S284.

According to one or more embodiments of the present invention, the server can continually receive and process payload data to refine the model distributions incrementally. Thus, the server would continue receiving the payload data and control would optionally pass to step S252 where a new length distribution would be created. Furthermore, one or more embodiments of the present invention can set a time frame for which the server would be required to generate a new model distribution. Thus, once the timeframe has expired, the server would collect data and create a new length distribution at step S252 and redefine the model payloads.

Automatic Training and Calibration

According to one or more embodiments, the present invention can perform automatic training and calibration. The present invention is also capable of stopping automatically when it has been sufficiently trained. For example, a training process can be designed such that it is fully automated. An epoch size and threshold can be established once, and the system would independently decide when sufficient training has been received. The epoch corresponds to a predetermined length of time or a predetermined amount of data. Furthermore, the training and calibration can be performed based, for example, on user-specified thresholds. Alternately, the system could determine an initial threshold for each payload model by testing training data and choosing the maximum distance value, for example. The number of packets captured for each epoch can optionally be adjusted by the user. After each training epoch, new models that have just been computed are compared to the models computed in the previous epoch. The training ends when the models become "stable".

Figure 8:
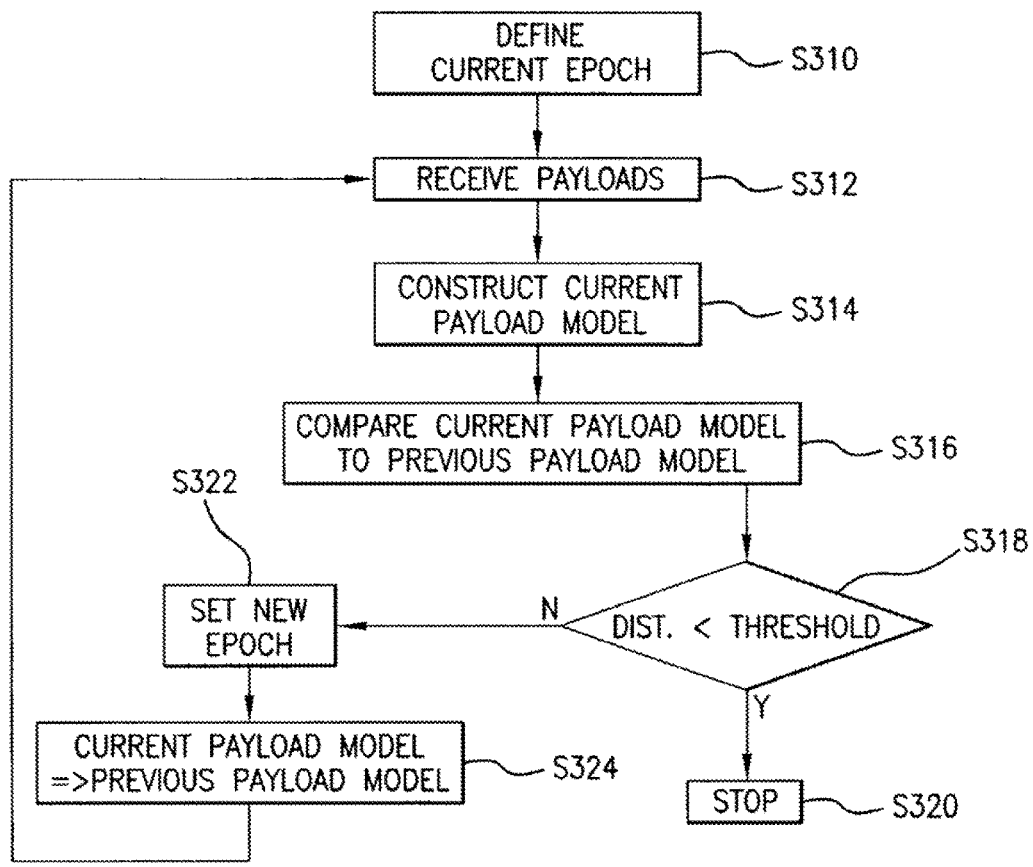
FIG. 8 is a flowchart illustrating the manner in which payload data is automatically collected according to one or more embodiments of the present invention.

FIG. 8 is a flowchart illustrating the manner in which the server can detect when sufficient payload data has been received to construct the model payload according to one or more embodiments of the present invention. At step S310, the server would define a current epoch. An epoch corresponds to a predetermined length of time during which data can be, or is being, received. At step S312, the server would receive payload data in the normal fashion. At step S314, a current payload model is constructed by the server. The current payload model corresponds to a payload model for all the payload data that has been received during the current epoch.

At step S316, the current payload model is compared to a previous payload model. Accordingly, during the first epoch, there would be no previous payload model to which the current payload model can be compared. In one or more embodiments of the present invention, the server can be provided with an initial payload model that has previously been collected. Thus, during the first iteration, the current payload model would be compared to the saved initial payload model. The comparison between the current payload model and the previous payload model can be done in many ways including, for example, calculation of a statistical distance between the two different distributions.

At step S318, it is determined if the distance between the current payload model and the previous payload model is less than a predetermined threshold. If the distance is less than the predetermined threshold, then sufficient data has been collected to construct the payload model. The process stops at step S320. Accordingly, the current payload model would be used as the model payload for comparing the incoming payload data. Alternatively, if the distance is greater than the threshold value, then a new epoch is defined at step S322. At step S324, the current payload model is designated as the previous payload model. Control then returns to step S312 where the server receives payload data for the new epoch which has been set at step S322. The process repeats iteratively until the distance between the current payload model and the previous payload model is less than the threshold value.

According to one or more embodiments of the present invention, the stability for each model for each port can be decided by two metrics: the first is the number of new models (before clustering) produced in an epoch; the second is the simple Manhattan distance of each model after the current epoch to the one computed in the previous training epoch. If both metrics are within some threshold, the models are considered stable and training is stopped. If multiple ports are being monitored, an additional metric can be used. This additional metric can examine the percentage of the stable ports out of the total ports being monitored. If the percentage of stable ports is higher than some user-defined threshold, the whole training process is concluded. Models of the "unstable" ports could optionally be discarded because they are not well trained and shouldn't be used for anomaly detection during testing.

Once the training is complete, an anomaly threshold can be determined. Instead of using a universal threshold for all the centroids, one distinct threshold is selected for each. Such fine-grained thresholds can improve the accuracy. This can be accomplished in various ways. For example, sampling can be performed during the training phase. The samples can then be used to help decide the initial thresholds used during detection time automatically. During the training process, a buffer of payload samples is maintained for each centroid. There are minimum and maximum number of samples, and a sampling rate s %. Before reaching the minimum number, every packet payload in this bin will be put into samples. Each payload then has a probability, s, of being put into buffered samples. After filling the buffer to its maximum size, a first in first out (FIFO) style buffering is used. The oldest one will be rotated out when a new sample is inserted. After the whole training phase is finished, the samples are computed against the centroid and the maximum distance is used as the initial anomaly threshold for that centroid. Because of the FIFO style sampling, the computed threshold reflects the most recent payload trend, and performs an adaptive learning to accommodate concept drift. This means the models, and the calibrations are computed to favor the more recent environment in which the system has been embedded.

At the very beginning of testing, the present invention can also run in epochs. After each epoch, the generated alert rate is compared against some user-defined number. If the total alert rate is too high, the threshold will be increased by t % and starts the next epoch. Such a cycle repeats until the alert rate reaches the desired rate. After this calibration phase, the system would be considered stable and ready to run in detection mode. It should be noted that the system continues to train a new model to keep the models refreshed and up to date to reflect the latest environment.

Detecting Anomalous Payloads

Figure 9:
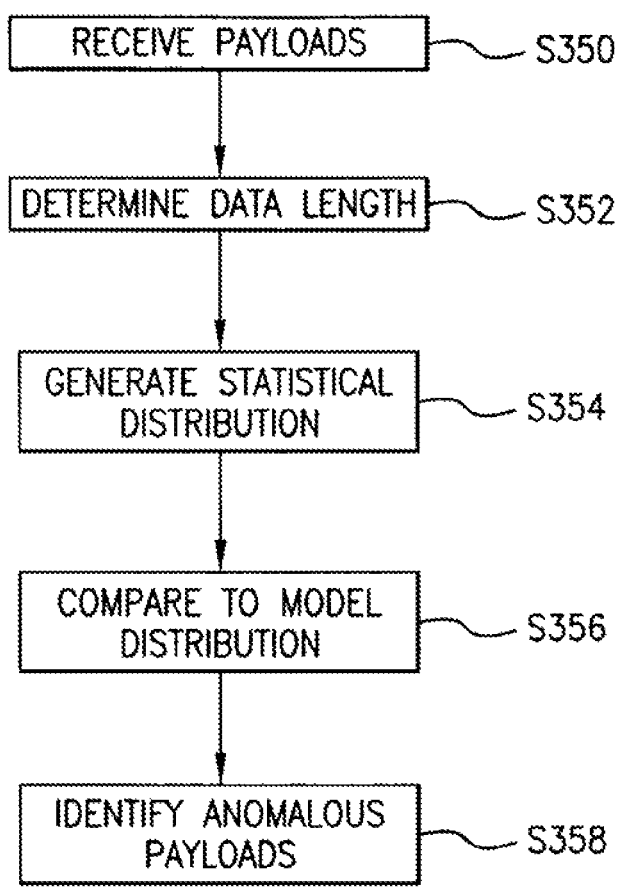
FIG. 9 is a flow diagram illustrating the steps performed to detect anomalous payloads transmitted through a network.

FIG. 9 is a flow diagram illustrating the steps performed to detect anomalous payloads transmitted through a network according to one or more embodiments of the present invention. At step S350, the server receives payload data from the network. This corresponds to data that can be received, for example, from either an external, internal, wireless, or satellite network, etc. At step S352, the server determines the length of data contained in the payload. At step S354, a statistical distribution is generated for the data contained in the payload. For example, the server would analyze the data contained in the payload and generate, for example, a statistical distribution of characters occurring in the data, as previously discussed. At step S356, the statistical distribution of the payload data is compared to a model distribution. For example, the server would contain a plurality of model distributions, as previously discussed, that can be retrieved and applied to appropriate sizes of payloads. At step S358, the server identifies anomalous payloads as those payloads that, for example, are sufficiently different from the model distribution based on predetermined user criteria. Accordingly, any payload that is identified as anomalous would be either discarded or further analyzed.

Figure 10:
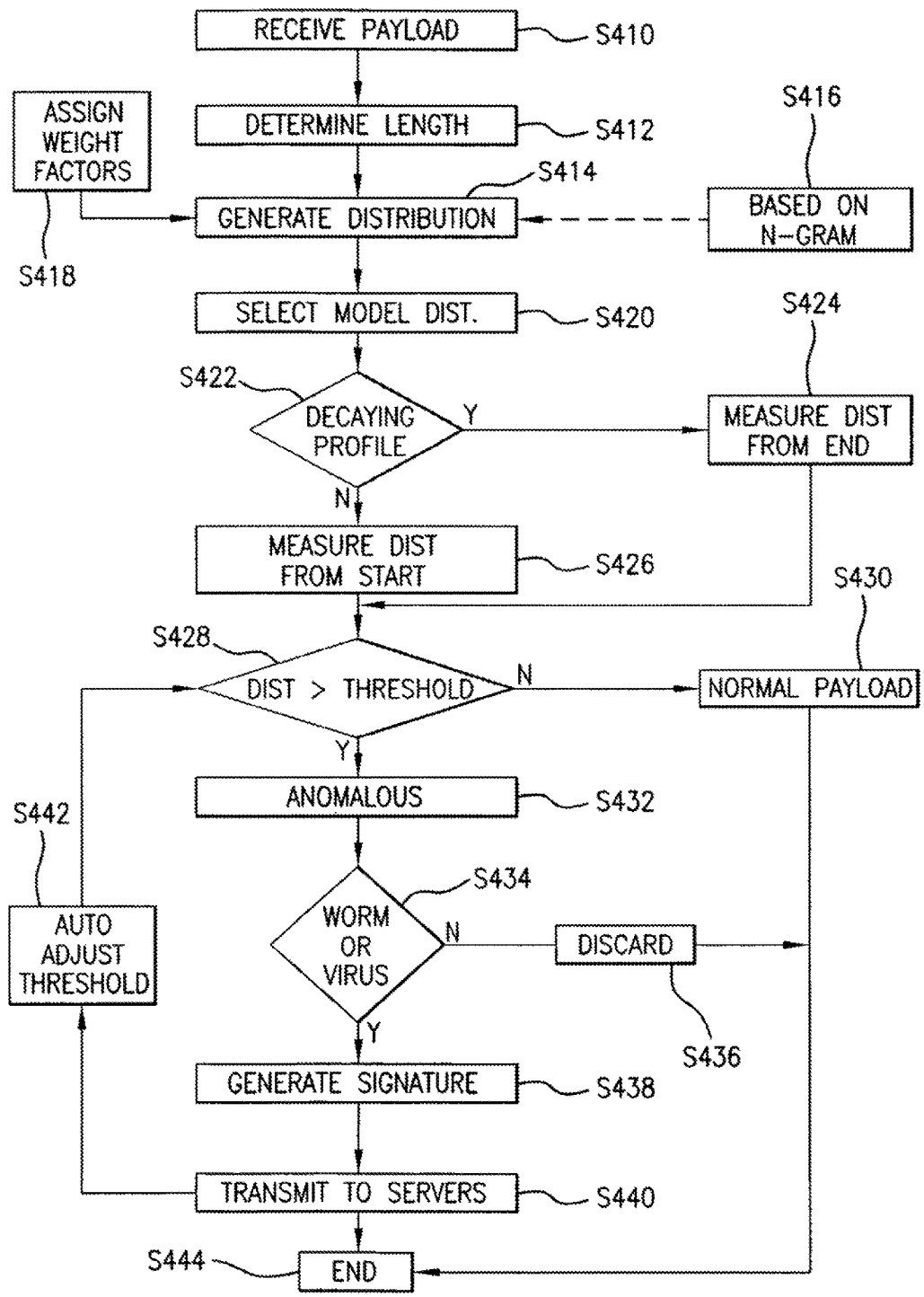
FIG. 10 is a flowchart illustrating the steps performed to detect anomalous payloads according to one or more embodiments of the present invention.

FIG. 10 is a flowchart illustrating the manner in which anomalous payloads can be detected according to one or more embodiments of the present invention. At step S410, the payload is received by the server. At step S412, the server determines the length of data contained in the payload. At step S414, a statistical distribution is generated for the payload data. According to one or more embodiments of the present invention, the payload data can be distributed using, for example, an n-gram or mixed-gram distributions. This is illustrated at step S416. According to one or more embodiments of the present invention, various weight factors can be assigned to different byte values in the statistical distribution. This is illustrated at step S418. The various weight factors are selected so that byte values that can possibly correspond to operation codes of a computer or network device are weighted higher, and thus examined with greater scrutiny. The weight factors can, at least in part, improve the server's ability to detect malicious programs such as worms that execute various operation codes of the computer or device. For example, the operation codes can be machine code for jump instructions, or to script language characters corresponding to arithmetic operations and so forth.

According to such embodiments of the invention, anomalous payloads with a higher likelihood of containing malicious computer code can be quickly identified. Thus, when an alert is generated for some payload, that payload can optionally have a separate test to determine if it contains byte values of special interest, or alternatively, the scoring of a payload could be changed to increase its "distance" from the normal distribution if it contains "distinguished" byte values. Accordingly, the Mahalanobis distance can be modified to account for the weighted values, or a different distance function that factors the weighting certain byte values can be used. At least some of the benefits of such embodiments include: improved accuracy in identifying malicious code, reduction of false positives, and assistance in quickly identifying a payload anomaly as a true zero day exploit or worm.

At step S420, a model distribution is selected by the server. The model distribution is selected such that it encompasses the length of data contained in the payload. For example, as previously discussed, if one of the model distributions corresponds to a payload length of 150 to 155 bytes, then any received payload data having a length falling within that range would be compared to that model distribution. At step 422, it is determined whether the profile of the model distribution is a decaying profile. This can occur, for example, in situations where the model distribution is arranged in a rank ordered byte frequency count. Thus, the first entries would have a greater value, which decays to a small value toward the end of the chart.

As previously indicated, the computational complexity is linear in the length of the connection. To make it faster, the computation can be started from the tail of the character frequency distribution and stop immediately if the distance is larger than the threshold, for both Mahalanobis distance and the string edit distance. The tail part of the distribution are those characters that never occurred in the training dataset (those with zero frequency), or those that very seldom appeared (a very low frequency). If such characters appear in the test data, there is a high probability that the data is anomalous and therefore may be malicious. Accordingly, the time to detect the malicious connection can be reduced.

Accordingly if the model distribution has a decaying profile then at step S424, the server selects an option to compute the distance measurement from the end of the distribution. Alternatively, if the model distribution does not have a decaying profile, then at step S426, the server selects the option to measure the distance from the start of the model distribution. The distances measured at step S424 and S426 corresponds to the comparison made with the model distribution to determine the differences between the received payload data and the model distribution. As previously discussed, various techniques can be used to calculate the distance between the two distributions. At step S428, it is determined if the distance is greater then a predetermined threshold value. For example, the threshold value would correspond to a minimum distance allowed between the received payload and the model distribution. If the distance is less than the threshold value, then the server identifies the payload data as normal data at step S430. Alternatively, if the server determines that the distance exceeds the threshold value, then the payload is identified as being anomalous at step S432. If the payload is considered to be a normal payload at step S430, then it is simply directed to the identified destination and the process ends at step S444. However, for payloads that are determined to be anomalous, the server can perform additional tests to identify various characteristics of the data contained in the payload.

For example, at step S434 the server determines whether the payload corresponds to a malicious programs, such as, for example, a worm or virus. This can be done in various ways. For example, the server can compare various features of the payload data to known worm or virus signatures. Alternatively, the payload data can be transmitted to a controlled site where the program may be allowed to execute, or it may be emulated, so that it can be determined whether the program is in fact malicious.

According to one or more embodiments of the present invention, the server can identify the longest common string, or longest common subsequence, found in payloads that are considered to be anomalous. If inbound (or ingress) packets or payloads are deemed anomalous, and outbound (or egress) packets or payloads are deemed anomalous, and the inbound packets have the same destination address as the outbound packets, then the payloads can be compared to determine the longest common strings, or the longest common subsequences of both anomalous payloads. Based on the longest common string, or the longest common subsequence, the host would generate a signature which identifies the particular worm or virus and serves as a content filter for the worm or virus. If the anomalous data is determined not to be in fact a worm or virus, then it is discarded at step S436 and the process ends for that particular payload data. Alternatively, if the payload is determined to be a worm or virus, then the signature is generated at step S438. At step S440, any virus patterns or worm signatures that have been generated by the server are transmitted to other servers, routers, workstations, etc. for content filtering.

According to one or more embodiments of the present invention, the server can automatically adjust the threshold value to assist and/or improve the ability to detect anomalous payload data. This is illustrated at step S442. For example, one method of automatically adjusting the threshold value requires that the server set an alert threshold. The alert threshold would correspond to a predetermined number of alerts that the server would generate. Each alert would correspond to one anomalous payload data. Thus, if the alert threshold is 100 for a one hour period of time, then the server would automatically adjust the threshold if 100 alerts are not generated within a one hour period of time. The server can also have a margin of error such as, for example, ±5 alerts. Therefore, if the server generates 95 to 105 alerts within an hour period no adjustment is made. However, if the server generates only 80 alerts within the time period, this would suggest that the threshold value is too high and the distance between received payloads and the model payloads is not long enough to exceed the threshold. Therefore, the server would reduce the value of the threshold so that a greater number of alerts would be generated. Alternatively, if the server is generating a greater number of alerts, such as 150, then the threshold can be increased so that fewer alerts are generated.

Figure 11:
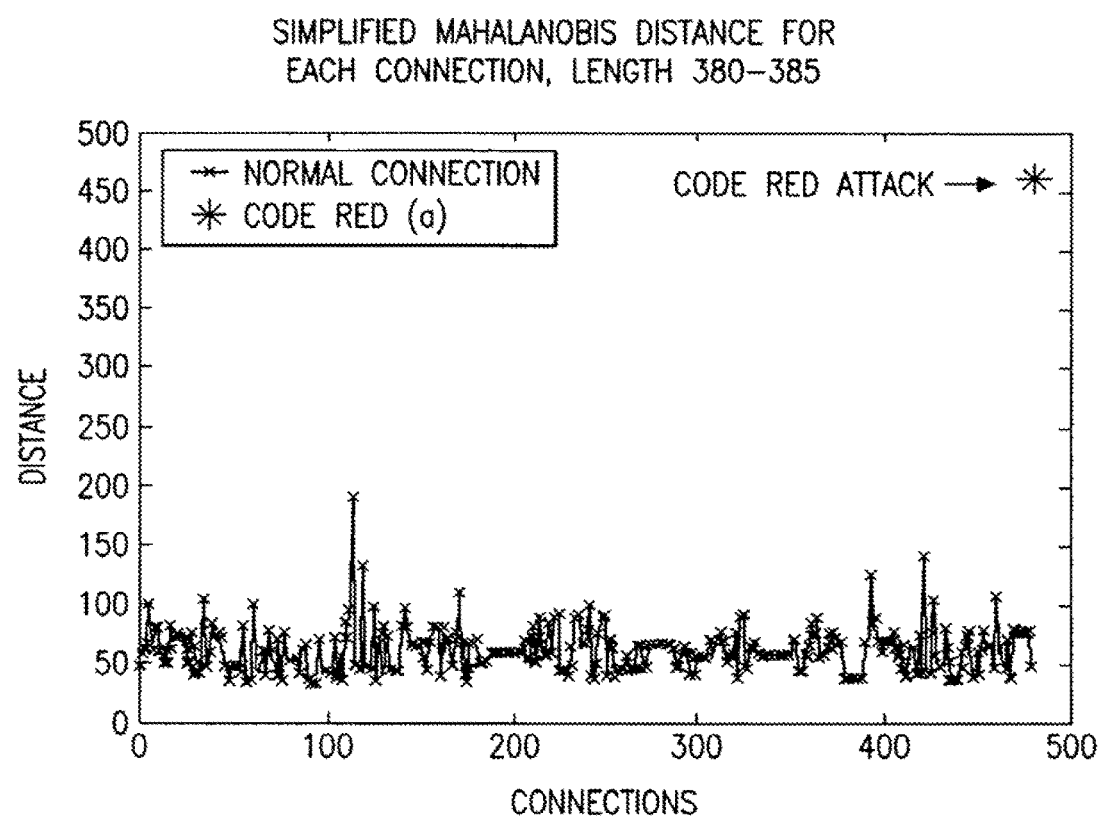
FIG. 11 is a chart illustrating detection of an example worm.

FIG. 11 is a graph showing the distance of various payload data from the model distributions. The plurality of the payload data fall within a predetermined distance from the model payload. However, the code red worm has a distance which far exceeds the general clustering of normal received payloads. Thus, in this situation, the server would easily identify the code red worm as a potential attack on the server.

For the example shown in FIG. 11, the actual payload of the Code Red worm was used as the target for detection to show how effective this technique can be at detecting zero day worm and viruses. The training data was sniffed from the web traffic to a web server over a 24 hour period of time. The training payloads were partitioned into different subsets according to their length partitioning, and the normal models were computed. The Code Red payload was then analyzed. The distribution of byte values in its payload was computed, and compared to the normal payload profile distribution.

The graph in FIG. 11 shows the simplified Mahalanobis distance of connections within length range 380-385, for both the normal connections and the Code Red attack. As can be seen, the Code Red attack connection has a much larger distance than all the other normal connection. Accordingly, given a predetermined threshold, it can easily be detected as something malicious and rejected without damaging the web server. The threshold can be set during the training phase. One possible value is the maximum of the training data's distance values plus some tolerance. Using this technique, the host can be protected from the virus/worms even before any virus signature is released.

Instead of using the distance metrics to compute the similarity, the "normal payload signature Z-string" can also be used to achieve the same goal. Having the profile "signature Z-string" and the byte string of new connection data to be tested, a simple string edit distance can be used to get their similarity score. The string edit distance just counts how many characters are misplaced from the profile signature string. One advantage of the string edit distance is the fact that it doesn't involve any numerical computation but just equivalence comparison of strings. This can result in a very fast distance calculation.

Exemplary Usage of the Invention

Network Appliances

One or more embodiments of the present invention may be implemented on a computer system that passively sniffs and audits network traffic on a computer network, or may be implemented on the same computer operating a network firewall, or may be implemented on a host or server computer for which a profile has been computed. One or more embodiments envision building a network appliance capable of computing normal payload models for a multitude of services and ports, for both inbound and outbound traffic. The appliance may distribute anomaly detection models to a firewall for filtering traffic to protect any service on the network. Alternatively, the payload detection system can be implemented on a network interface card of a host or server computer without the need to install new software on the server or host, or to install a new appliance or device on the network system.

Incremental Learning

According to one or more embodiments of the present invention, a 1-gram model with Mahalanobis distance can be implemented as an incremental version with only slightly more information stored in each model. An incremental version of this method can be particularly useful for several reasons. First, a model may be computed on the fly in a "hands-free" automatic fashion. That model will improve in accuracy as time moves forward and more data is sampled. Furthermore, an incremental online version can also "age out" old data from the model keeping a more accurate view of the most recent payloads flowing to or from a service.

One or more embodiments of the present invention allow older examples used in training the model to be aged out. This can be accomplished, at least in part, by specifying a decay parameter of the older model and emphasizing the frequency distributions appearing in the new samples. This allows automatic updating of the model to maintain an accurate view of normal payloads seen most recently.

Computation of the incremental version of the Mahalanobis distance can be accomplished in various ways depending on the specific implementation of the present invention. For example, the mean and the standard deviation is computed for each ASCII character seen for each new sample observed. For the mean frequency of a character, $\bar{x}=\Sigma_{i=1}^{N}x_i/N$ is computed from the training examples. Optionally, the number of samples processed, N, can be stored. This allows the mean to be updated as $$\bar{x} = \frac{\bar{x} \times N + x_{N+1}}{N+1} = \bar{x} + \frac{x_{N+1} - \bar{x}}{N+1}$$

when new sample $x_{N+1}$ is observed. Since the standard deviation is the square root of the variance, the variance computation can be rewritten using the expected value E as:

$$Var(X)=E(X-EX)^2=E(X^2)-(EX)^2$$

The standard deviation can be updated in a similar way if the average of the $x_i^2$ in the model is also stored.

According to such embodiments of the present invention, only one additional 256-element array needs to be maintained in each model that stores the average of the $x_i^2$ and the total number of observations N. Thus, the n-gram byte distribution model can be implemented as an incremental learning system easily and very efficiently. Maintaining this extra information can also be used in clustering samples as described in greater detail below.

Reduced Model Size by Clustering

As previously discussed, a model $M_{ij}$ is computed for each observed length bin i of payloads sent to port j. Under certain circumstances, such fine-grained modeling might introduce problems. For example, the total size of the model can become very large. This can occur when the payload lengths are associated with media files that may be measured in gigabytes and many length bins are defined. Consequently, a large number of centroids must be computed. Further, the byte distribution for payloads of length bin i can be very similar to that of payloads of length bins i−1 and i+1; because they vary by one byte. Storing a model for each length can sometimes be redundant and wasteful. Another problem is that for some length bins, there may not be enough training samples. Sparseness implies the data will generate an empirical distribution that will be an inaccurate estimate of the true distribution leading potentially to a faulty detector that generates too many errors.

The anomaly detection system of the present invention provides various possible solutions to address these problems. According to one or more embodiments of the present invention, one solution for addressing the sparseness problem is relaxing the models by assigning a higher smoothing factor to the standard deviations. This can allow higher variability of the payloads. At least one additional (or overlapping) embodiment of the invention "borrows" data from neighboring bins to increase the number of samples. In other words, data from neighboring bins is used to compute other "similar" models. Two neighboring models can be compared using the simple Manhattan distance to measure the similarity of their average byte frequency distributions. If their distance is smaller than some threshold t, those two models are merged. This clustering technique is repeated until no more neighboring models can be merged. This merging can also be computed using the incremental algorithm described before. As previously discussed, such a technique involves updating the means and variances of the two models to produce a new updated distribution.

For a new observed test data with length i sent to port j, the model $M_{ij}$, or the model it was merged with can be used. If the length of the test data is outside the range of all the computed models, then the model whose length range is nearest to that of the test data is used. In these cases, the mere fact that the payload has such an unusual length unobserved during training may itself be cause to generate an alert.

It should be noted that the modeling algorithm and the model merging process are each linear time computations, and hence the modeling technique is very fast and can be performed in real time. Additionally, the online learning algorithm assures that models will improve over time, and their accuracy will be maintained even when services are changed and new payloads are observed.

Correlated Ingress and Egress Traffic to Detect Worm Propagation and Generate Signatures Self-propagation is one key feature and necessary condition for worms. Self-propagation means that once a worm infects a machine, it will start to attack other machines automatically by attempting to send a copy of itself, or a variant thereof, to another susceptible host. For example, if a machine gets infected by worm Code Red II from some request received at port 80, then this machine will start sending the same request to port 80 of other machines. Such propagation pattern is true for almost every worm. So if some egress traffic to port i that is very similar to those anomalous ingress traffic to port i can be detected, there is a high probability that a worm aiming at port i is propagating itself.

According to one or more embodiments of the present invention, incoming malicious traffic can be detected, and an alert generated. At the same time, the payload can be provided as a string in the buffer for port i, and compared to the outgoing traffic against all the strings to see which return the highest similarity score. If the score is higher than some predetermined threshold, a possible worm propagation is presumed. In addition, the present invention can be implemented on a server machine such as, for example a web server. Web servers generally have a large amount of incoming requests but outgoing requests are typically unlikely. So any outgoing request is already quite suspicious, and should be compared against the malicious strings. If the host machine is working as both server and client, which means both incoming requests and outgoing requests are common, the same modeling technique would be applied to the outgoing traffic and only used to compare egress traffic already judge as malicious.

One or more embodiments of the present invention also provide multiple metrics which can be used to decide the similarity between two strings. The most common ones are longest common substring (LCS) or longest common subsequence (LCSeq). The difference between them is: the longest common substring is contiguous, while the longest common subsequence need not be. LCSeq has the advantage of being able to detect "polymorphic" and "metamorphic" worms; but they may introduce false positives. Other techniques such as probability modeling methods that take into account context dependent substring sizes can also be applied by the present invention. The similarity score returned is the percentage of the common part's length out of the total length of the malicious payload string. An alternative (or overlapping) implementation to compute a signature would be to compute the set of (at least one) most frequently occurring substrings within the payload appearing in two or more examples of anomalous data.

According to one or more further (or overlapping) embodiments, the present invention can be used to automatically generate worm signatures. By computing the similarity score, the matching substring or subsequence, which represents the common part of the ingress and egress malicious traffic are also computed. Since the traffic being compared is already judged as malicious, which means the payload is quite different from the normal ones, these common strings represent the worm's content signature. Thus, by correlating the ingress and egress malicious payload, the present invention is capable of detecting the very initial worm propagation, and identifying its signature or partial signature immediately without any external involvement. This helps to solve the zero-day worm problem. Such signatures may then be communicated to other hosts and devices for content filtering to eliminate any further occurrence of the worm infecting any other hosts on the network.

More Accurate Worm Detection by Collaborative Security

According to one or more embodiments of the present invention, the anomaly detection system can be implemented on multiple hosts and devices on a network. The hosts and devices can then collaborate with each other, for example, by exchanging alerts and possible worm signatures. Accordingly, a worm can be quickly identified and prevented from spreading because multiple hosts report the same worm signature to each other. The signature can then be announced in order to apply content filtering quickly all over the network. Using such collaborative security strategies, it is possible to reduce the likelihood that worms can spread throughout and occupy the network.

Identifying Files

There are various complications that can result from networked environments, some relating to the fact that the network may be used in an office environment. Compounding these problems are the high speeds at which data can be transmitted across multiple networks. Consequently, network operations and/or security personnel may wish to know how computers in the network are actually used and what types of data are communicated among hosts inside and outside the network. This can entail, for example, determining the types of files and media being transmitted among computers (and users) within the network. While most transmissions are generally harmless, they can sometimes provide an avenue for spreading malicious programs such as viruses and worms. Furthermore, some employers maintain confidential and/or personal information that should not be disseminated outside the workplace. Such employers often enact policies that warn employees not to transmit certain files and/or information to computers outside of the company network. It can also be the case that employers do not wish certain file types to be received from (or transmitted to) external networks or computers.

In order to enforce some of these policies, traffic through the company network is typically monitored so that certain files can be blocked or examined. For example, an email attachment "Patent25.doc" may be examined if Word documents should not be transmitted to external computers. However, it is relatively simple to mask (or hide) the true type of a file by simply changing the extension associated with the file's name. Hence, a user can easily circumvent the security policy by changing the name of the file from Patent25.doc to HolidayPictures.jpg, for example. Alternatively, the file could be given a different suffix indicative of, e.g., an image file, and transmitted outside the network. Once received, the recipient could rename the file to Patent25.doc, and open it with, for example, Microsoft Word. Conversely, an incoming email attachment can be a virus or worm that has been renamed to, for example, Patent25.doc. Once opened, the virus could cause damage to the computer system.

Figure 12:
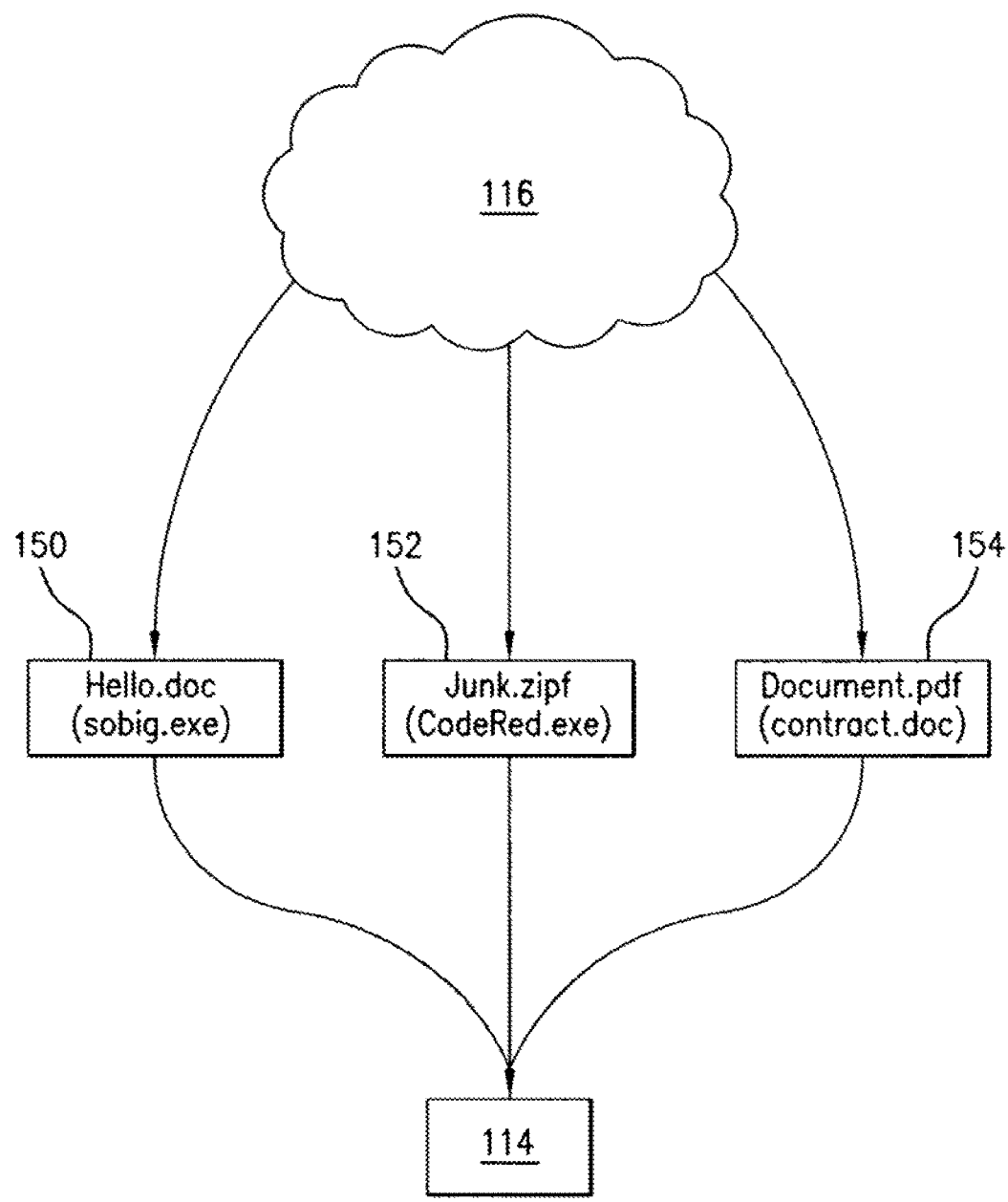
FIG. 12 is a block diagram conceptually illustrating delivery of different file types to a computer over a network.

FIG. 12 is a block diagram illustrating certain situations where files may be transmitted to a user covertly or under false pretense. For example, the workstation 114 is connected to a network such as the Internet 116. Three different file attachments have been transmitted to the workstation. The first file attachment 150 has the file name "hello.doc". This file is presumed to be a Microsoft Word file. However, such is not the case. The file is in fact a virus (sobig.exe) that has been renamed to appear as a Word document. The second file attachment 152 is entitled "junk.zip". This file may not necessarily be renamed, but is in the form of an archive file that can contain multiple archived contents. The archived contents cannot be seen until the archive file 152 is accessed or opened. There are situations where an operating system or mail program may automatically access the archive file 152 as soon as it is received. Thus, if a virus is contained within the archive file 152, it can automatically be released. The third attachment 154 is entitled "document.pdf" so that it will not be identified as a Word file. However, the file was originally named "contract.doc". All of the files can present potential problems to the workstation 114.

Figure 13:
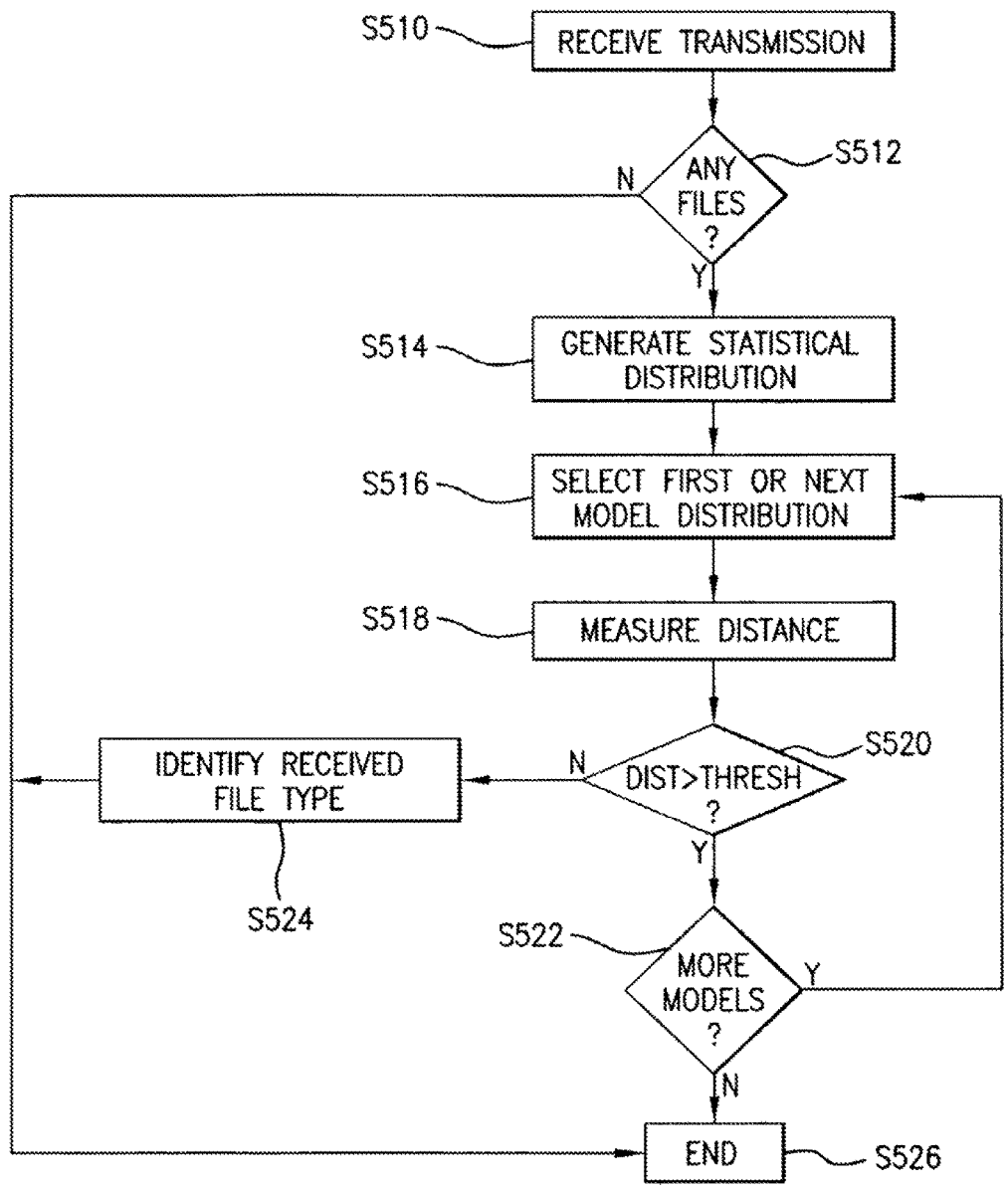
FIG. 13 is a flowchart illustrating the steps performed to identify file types according to one or more embodiments of the present invention.
Figure 14A:
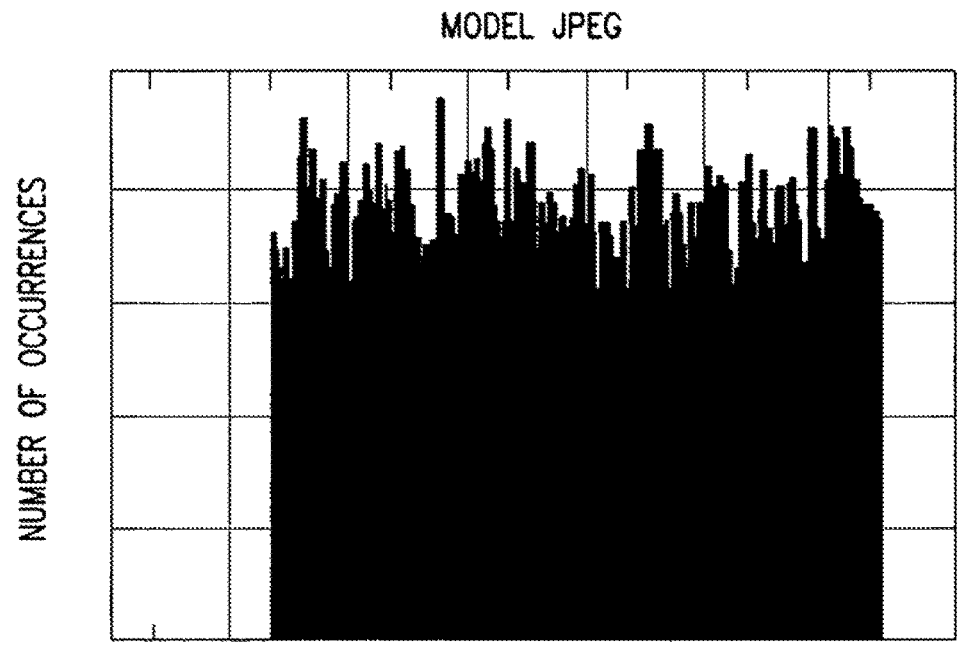
FIGS. 14A-14I are graphs illustrating the statistical distribution of different file types.
Figure 14B:
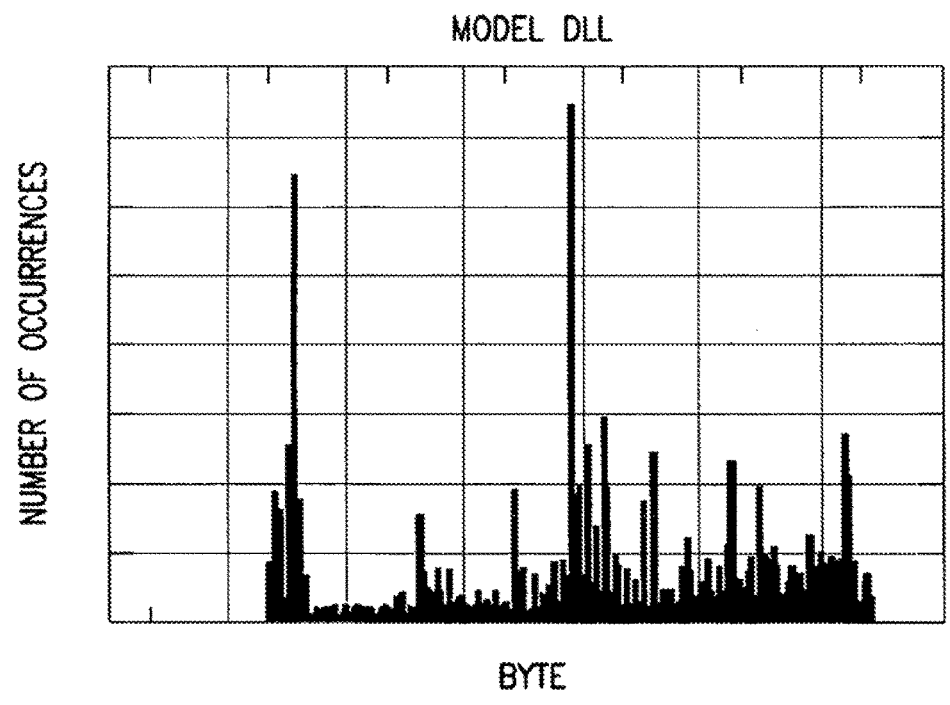
Figure 14C:
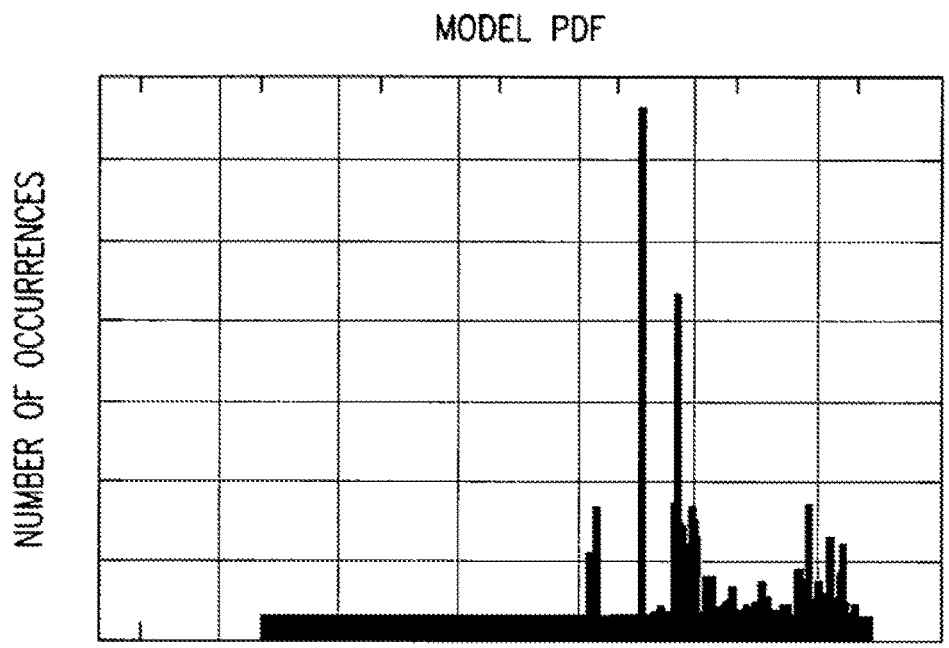
Figure 14D:
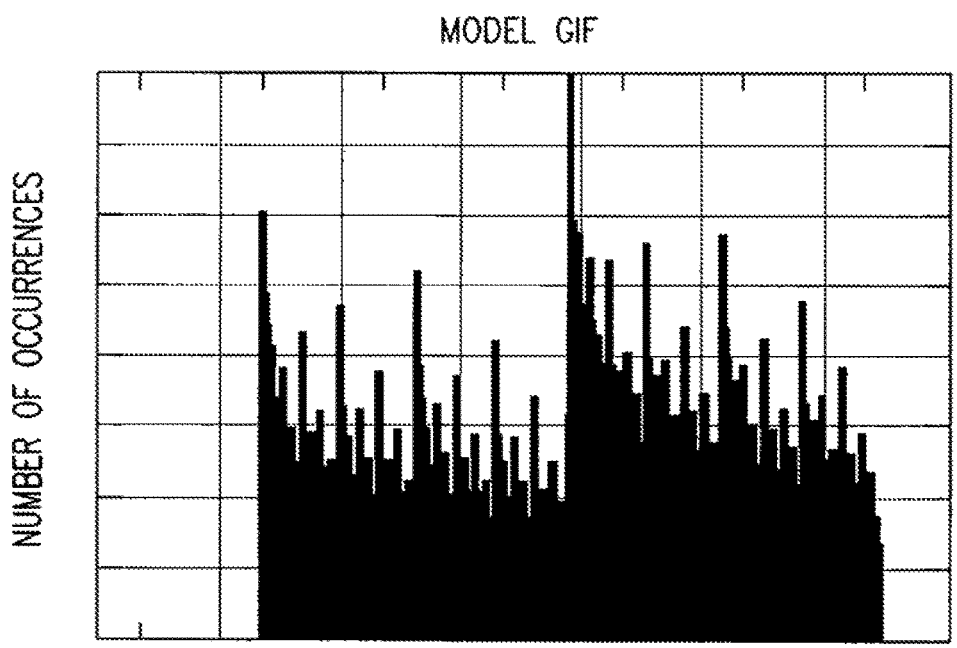
Figure 14E:
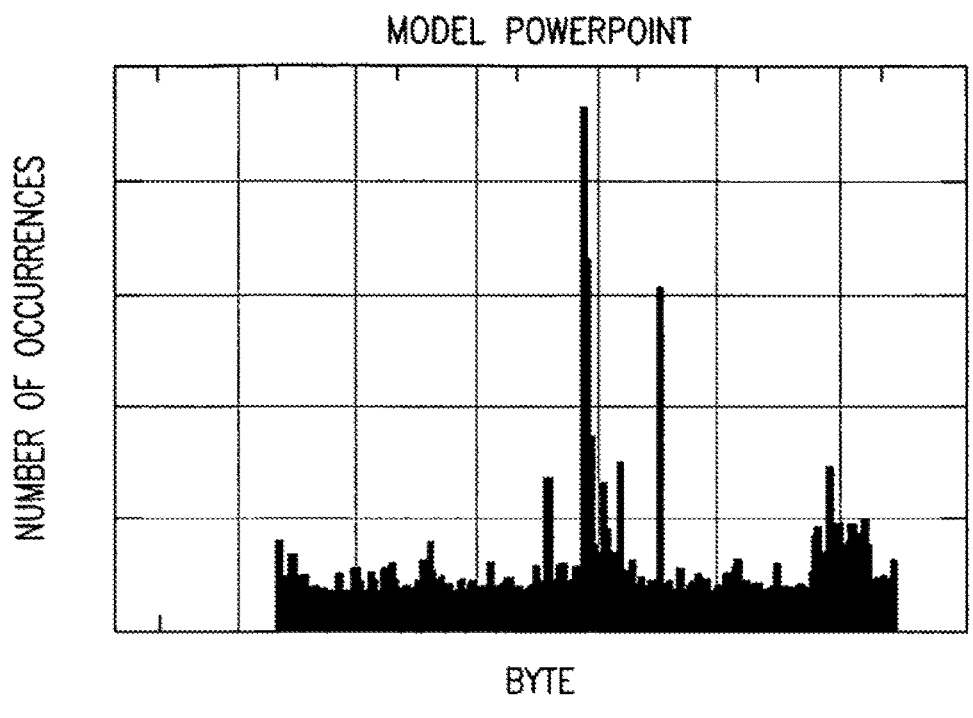
Figure 14F:
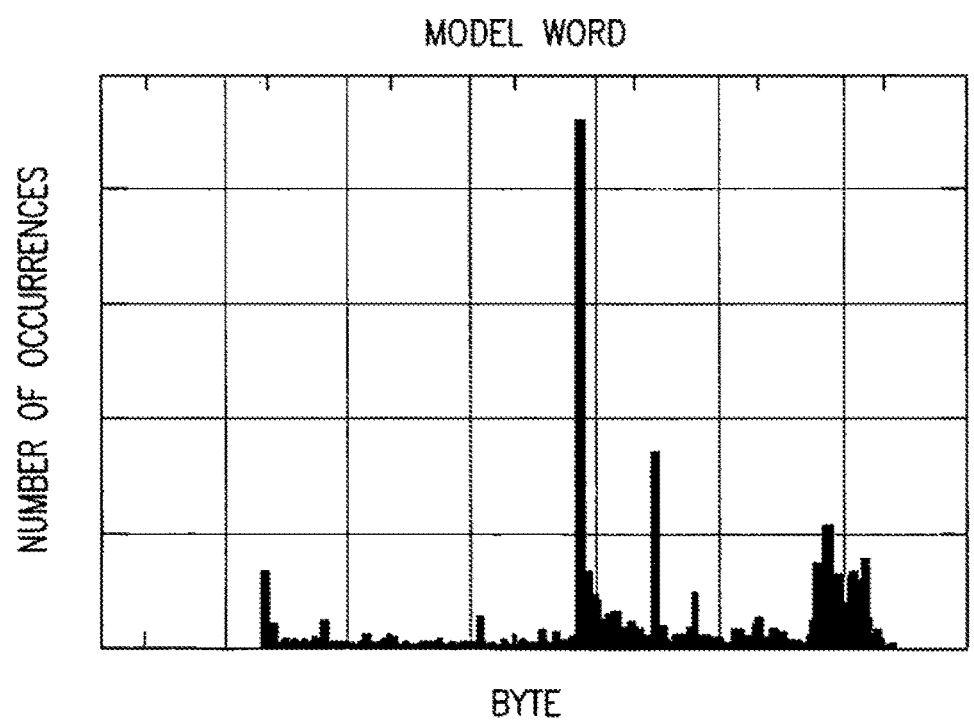
Figure 14G:
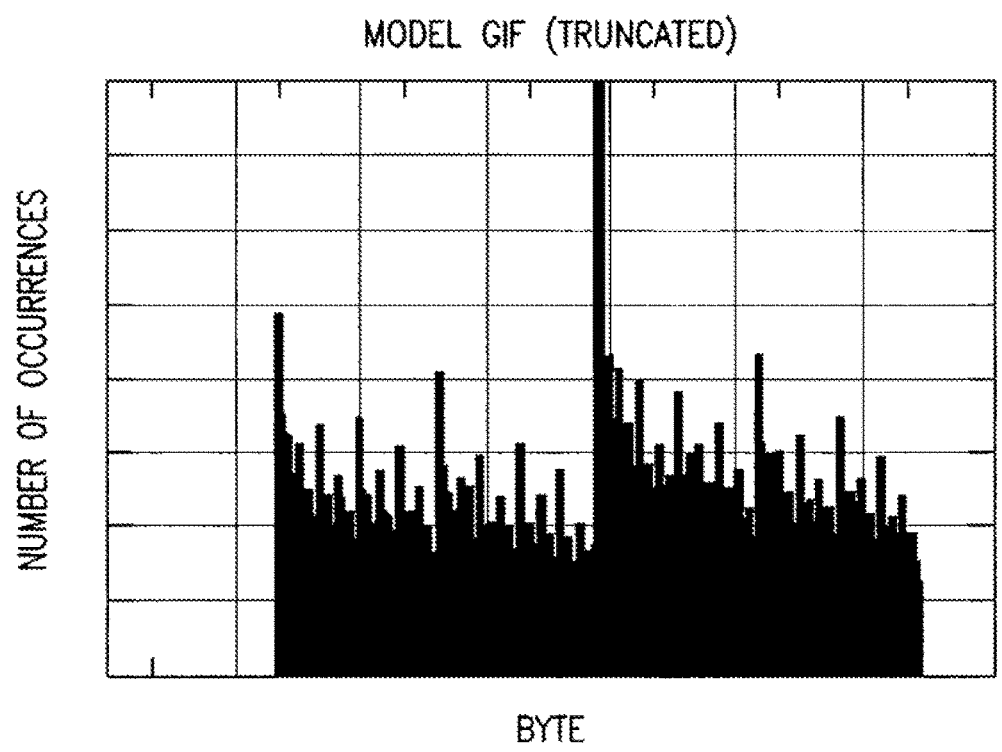
Figure 14H:
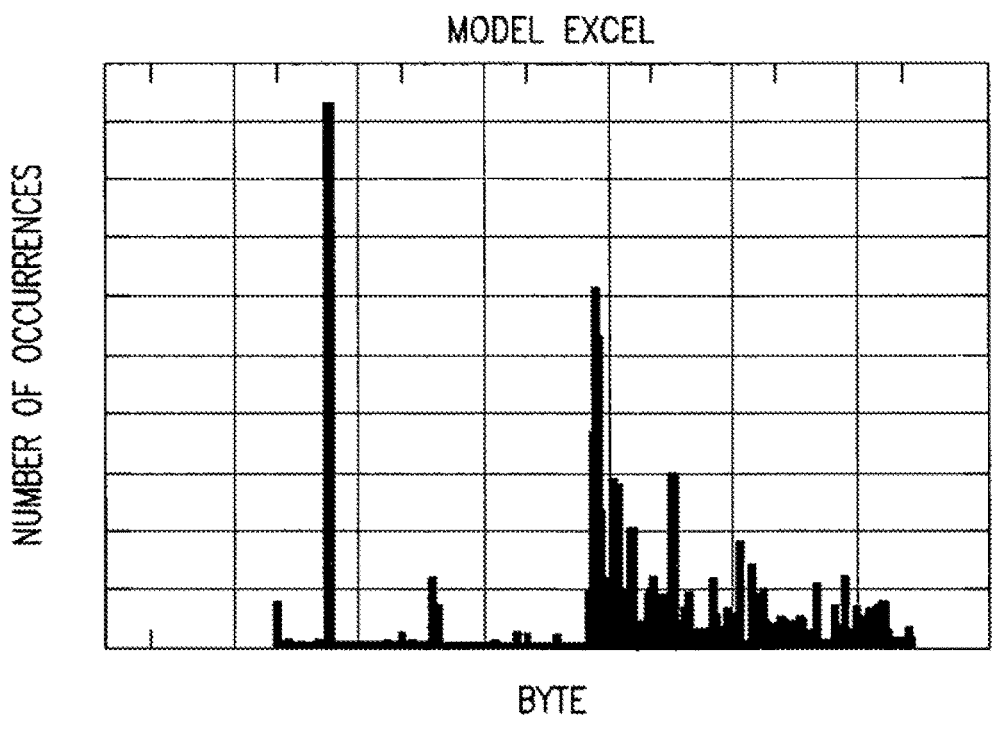
Figure 14I:
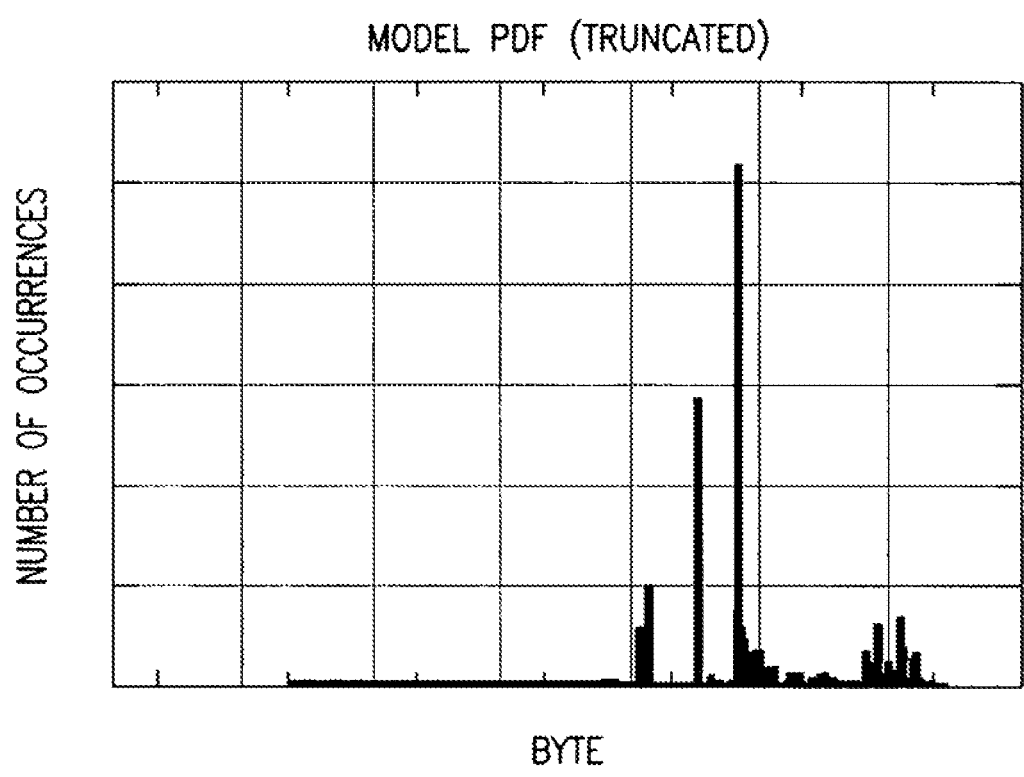

FIG. 13 illustrates a method of identifying file types being transmitted through a network according to one or more embodiments of the present invention. At step S510, a transmission is received through the network. The transmission can be a conventional email message, and can include various types of information such as, for example, text, attachments, etc. At step S512, it is determined whether the transmission contains any files. The files can be included in the transmission as part of an attachment to the email message. If the transmission does not include any files, then control passes to step S526 where the process ends. However, if it is determined that the transmission contains one or more files, then at step S514, a statistical distribution is generated for data contained in each of the files in the transmission.

At step S516, a model distribution is selected. The model distribution corresponds to one or more statistical distributions that have been generated for predetermined file types. For example, a particular model file distribution could be generated for a .gif file. Similarly, a model distribution could be generated for a .pdf file, a .doc file, a .jpeg file, etc., using concepts previously described and/or those described below. Referring additionally to FIGS. 14A-14I, model distributions of various file types are illustrated. At step S518, the distance between the statistical distribution for the file is measured against the model distribution. As previously discussed, various methods can be used to measure the distance including, but not limited to, the Mahalanobis distance. Additionally, if the transmission contains more than one file, then the distance test would be applied to each file contained in the transmission. At step S520, it is determined whether the distance between the received file and the model distribution is greater than a predetermined threshold. If this distance is greater than the threshold, then control passes to step S522. If the distance is less than the threshold, then control passes to step S524. At this point, the received file can be identified as being of a particular type. For example, the type for the model distribution is already known. Thus, the received file can be determined to be of the same type as the model distribution. Control would then pass to step S526 where the process ends.

At step S522, it is determined whether there are additional model distributions. If there are no more additional model distributions, then the process also ends without having identified, or being able to identify, the type of the received file. However, if there are additional model distributions available, then control returns to step S516 where the next model distribution is selected. The process would continue until the received files are tested against all of the model distributions and either a type is determined or a type cannot be determined. According to one or more embodiments of the present invention, if the type for the file cannot be determined, then the file can be discarded or identified as a potential virus or malicious program.

Figure 15:
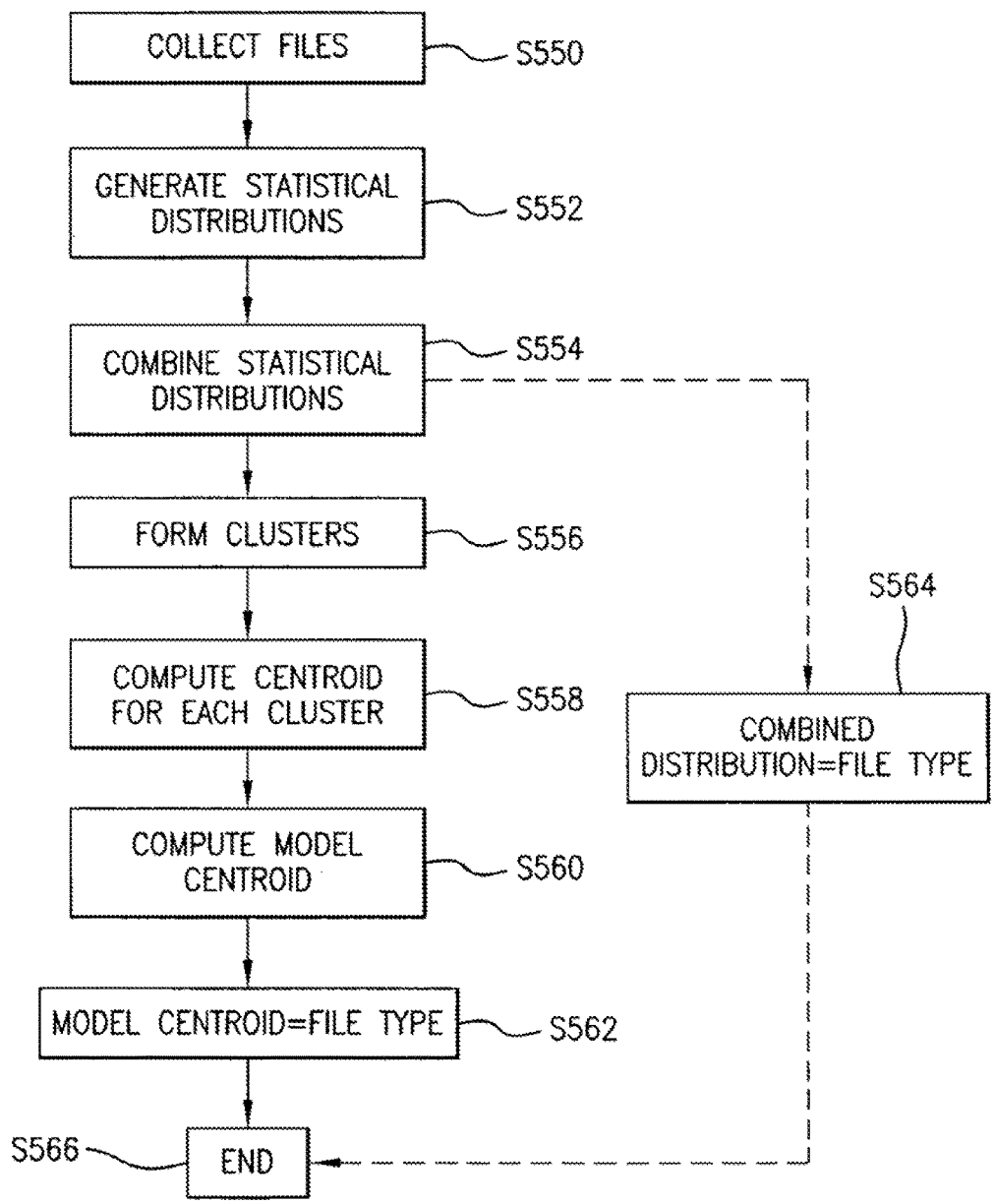
FIG. 15 is a flowchart illustrating the steps performed to model a file type according to one or more embodiments of the present invention.

FIG. 15 is a flowchart illustrating a method for modeling file types in accordance with one or more embodiments of the present invention. At step S550, a plurality of files are collected. The files are known to have a particular type and/or created as such types. For example, a plurality of .pdf files can be collected, or a plurality of .doc files, .jpeg files, .gif files, etc. As long as all of the files are of the same type, they can be used to generate the appropriate model. At step S552, a statistical distribution is generated for each of the files that have been collected. At step S554, the statistical distributions are combined. This can be accomplished in a variety of ways including, for example, simple addition of the distribution for each file collected.

At step S556, a plurality of clusters is formed for the statistical distributions. At step S558, a centroid is computed for each cluster formed for the statistical distributions. At step S560, a model centroid is computed. The model centroid corresponds to the centroid of the plurality of cluster centroids computed at step S558. At step S562, the model centroid is designated as the model to represent the particular file type. Accordingly, if .pdf files are being modeled, then the model centroid would correspond to a model distribution for .pdf files. At step S566, the process ends. According to one or more embodiments of the present invention, the model file type can also be based on the combined statistical distribution for all the files that have been collected. This is illustrated at step S564. Thus, the combined statistical distributions of the collected file would be assigned as the model distribution for the particular file type.

Figure 16:
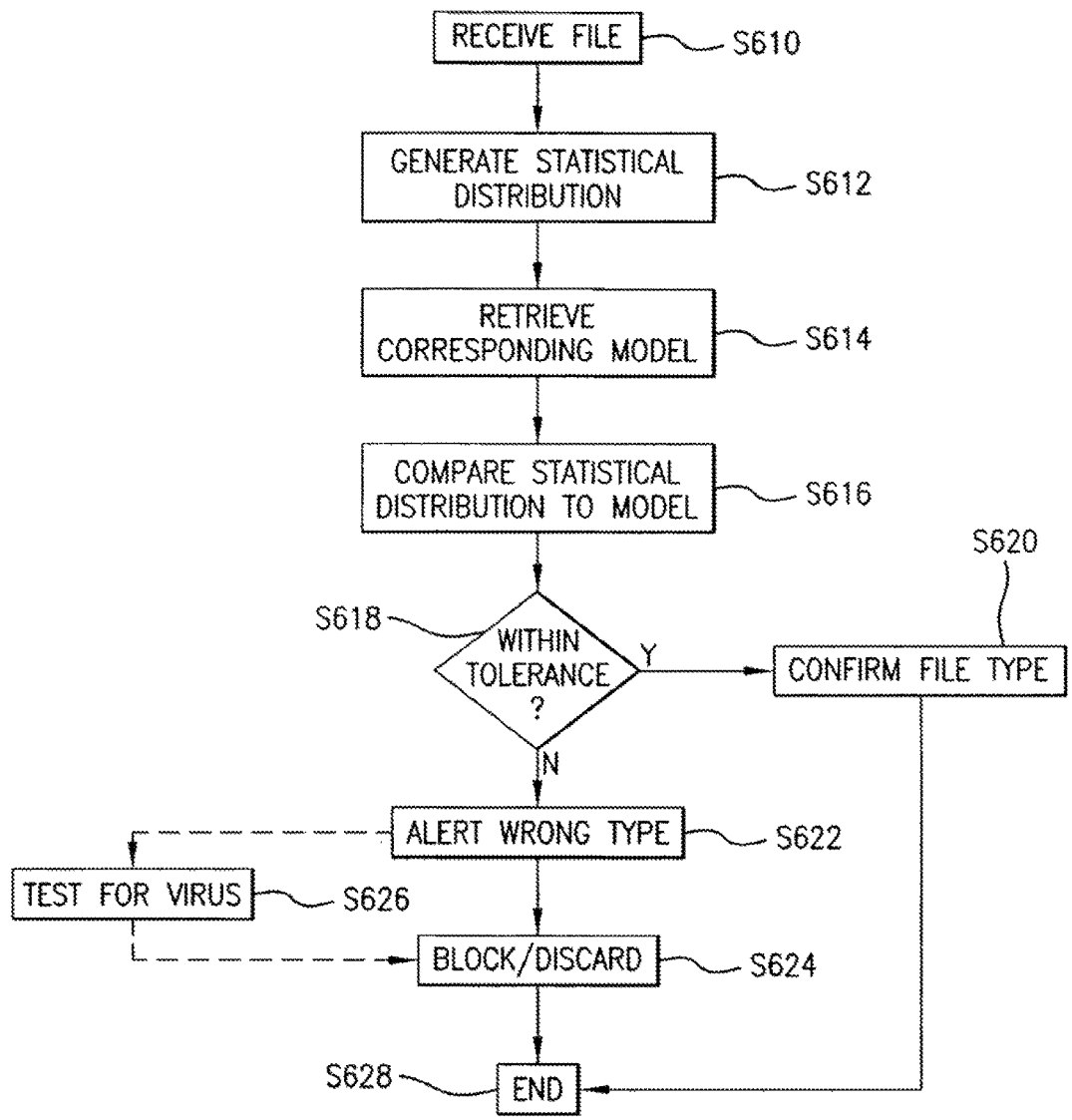
FIG. 16 is a flowchart illustrating the steps performed to verify file types according to one or more embodiments of the present invention.

FIG. 16 is a flowchart illustrating steps performed to verify file types according to one or more embodiments of the present invention. At step S610, the file is received. The file can be received from any of a plurality of sources including, for example, general network transmissions, electronic mail, or portable media. At step S612, a statistical distribution is generated for the file. At step S614, the model distribution corresponding to the received file type is retrieved. For example, if the received file type is tagged (or designated using a particular extension) as a jpeg file, then the appropriate model distribution for a jpeg file would be retrieved. At step S616, the statistical distribution for the received file is compared to the model distribution retrieved at step S614. At step S618, it is determined whether the statistical distribution for the received file is within the tolerance limit of the model distribution. More particularly, the distance between the statistical distribution for the received file and the model distribution is reviewed to determine whether it falls within the tolerance threshold.

If the distance for the statistical distribution for the received file is within the tolerance, then the file can be confirmed as being of the type specified in the file name. This is illustrated at step S620. The process would thus end upon confirming the type of the received file. Alternatively, if the distance of the statistical distribution for the retrieved file is not within the tolerance, then an alert can be generated to indicate that the file is actually not of the type specified in the file name. This is indicated at step S622. At step S624, the file can either be blocked or discarded from further transmissions through the network or workstation.

According to one or more embodiments of the present invention, upon detecting that a file is inappropriately named, and corresponds to a different file type, further testing can be performed to determine if the file is actually a virus purporting to be of a different file type. Control would then return to step S624 where the file can again be blocked or discarded from further propagation through the network. The process then ends at step S628.

Figure 17:
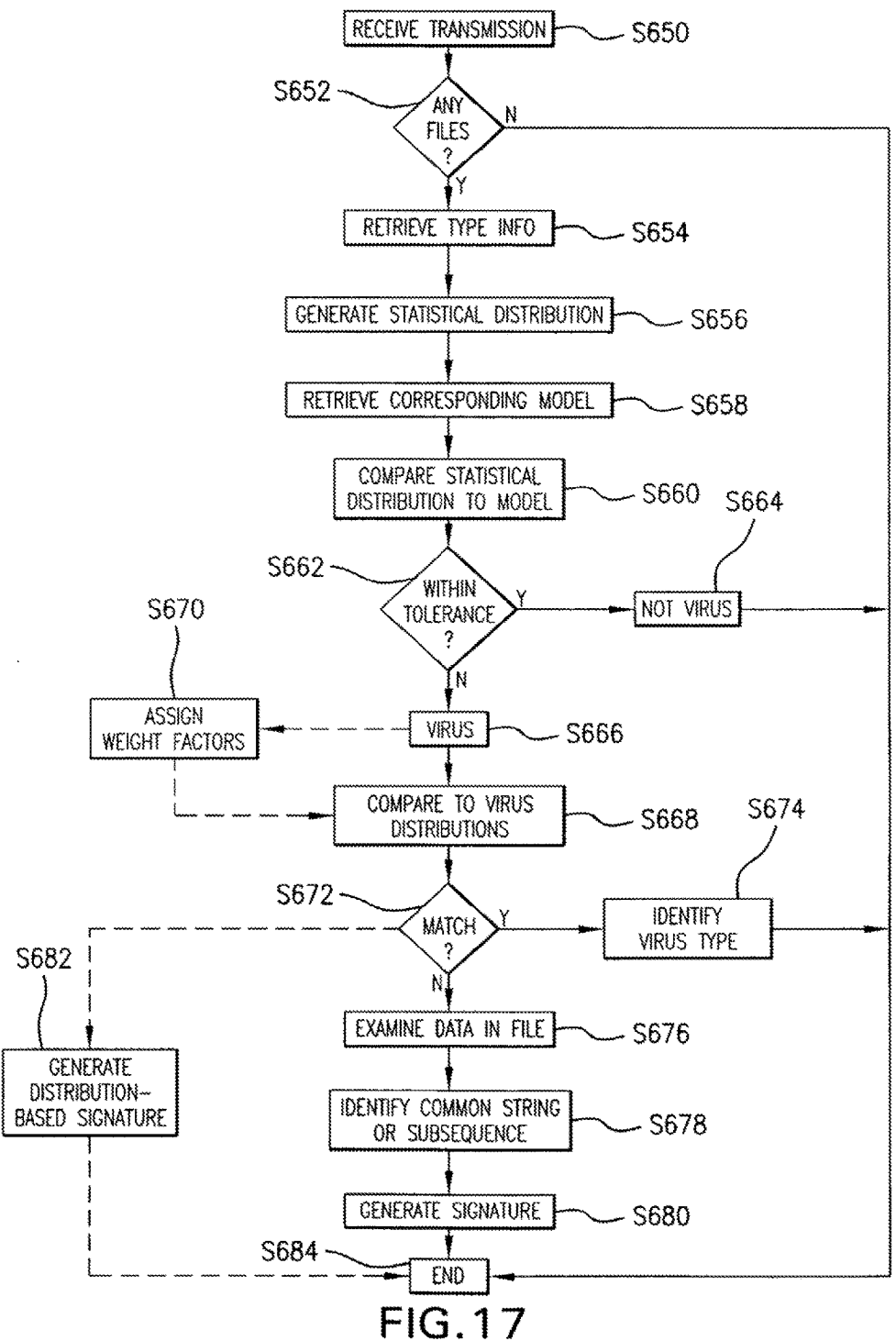
FIG. 17 is a flowchart illustrating the steps performed to identify malicious programs according to one or more embodiments of the present invention.

FIG. 17 is a flowchart illustrating steps performed to detect and/or identify malicious programs, such as viruses and worms, according to one or more embodiments of the present invention. At step S650, a transmission is received through the network or at a workstation. The transmission can be a transmission across a network between multiple computers, within the network, etc. Additionally, the transmission can correspond to internal transmissions of data within a single machine. For example, the transmission can correspond to reading of a file from a portable medium into the memory of the workstation.

At step S652, it is determined whether there are any files attached to the transmission. If no files are attached to the transmission, then the process ends. If any files are present in the transmission, then control passes to step S654. Information regarding the type of each file is retrieved. The information can be retrieved, for example, by examining the extension in the file name. At step S656, a statistical distribution is generated for the file. At step S658, the model distribution corresponding to the type of the file is retrieved. At step S660, the statistical distribution for the file is compared to the model distribution retrieved. At step S662, it is determined whether the statistical distribution for the file is within the tolerance threshold. If so, then the file is likely not a virus and would be identified as such at step 664. However, if a statistical distribution for the file is not within the tolerance, then the file is identified as a virus at step S666. At step S668, the statistical distribution for the file can be compared to any known virus statistical distributions.

According to one or more embodiments of the present invention, various weight factors can be assigned to different byte values within the statistical distribution. This is illustrated at step S670. As previously discussed, higher weight factors can be assigned to byte values that can possibly correspond to machine execution codes, script files, and/or other programs that can cause damage to the machine. At step S672, it is determined whether the statistical distribution for the file matches any of the virus distributions. If there is a match, then the virus type is identified at step S674. If no match is found, then control passes to step S676. Data contained in the file is examined in order to identify information regarding the virus. At step S678, any common strings or subsequences within the file are identified. At step S680, the common strings or subsequences are used to generate a signature for the virus. At step S684, the process ends. According to one or more embodiments of the present invention, rather than examining the data in the file to generate a signature, the statistical distribution for the file can be used as a signature string (or distribution). This is illustrated at step S682, where a distribution based signature is generated for the file (i.e., the identified virus).

Tracing Transmission Origin

According to one or more embodiments, the present invention can be used to address various problems associated with the use of large networks such as the Internet. One such problem involves the use of stepping stone proxies. These proxies are used by attackers (or hackers) to hide their true locations while launching attacks against various machines. Oftentimes, an attacker will initiate the attack from a "drone" machine that has previously been hacked and taken control of. These drone machines can subsequently launch denial of service attacks on various commercial computers, servers, websites, etc. Furthermore, the attacker can cause one drone machine to activate a second drone machine thereby initiating an attack. Once the attack is initiated, the target computer only sees information from the machine transmitting the attack command.

Since the attacker has taken control of the drone computer, the target computer would only see the IP address of the drone computer causing the attack. Hackers can use multiple levels, or stepping stone proxies, from which to launch such attacks. This makes it increasingly difficult to trace back the location of the actual attacker. To further complicate the situation, the drone computers can be given specific times for automatically contacting another drone and/or initiating an attack.

Figure 18:
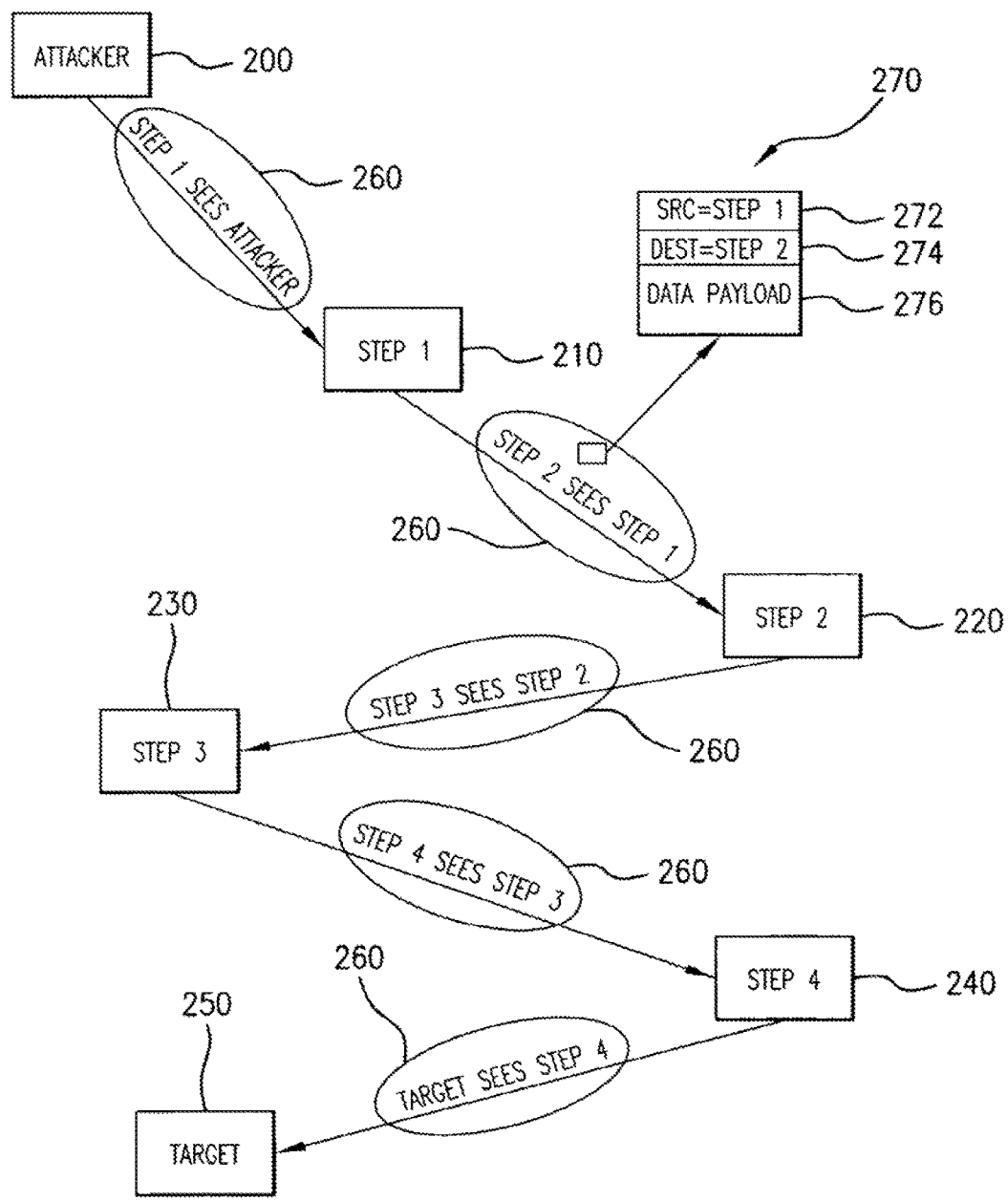
FIG. 18 is a block diagram conceptually illustrating an attack across several computer systems.

FIG. 18 illustrates one type of stepping stone situation. The attacker 200 initiates an attack against a target computer 250. The target computer can be in the same vicinity, country, or state of the attacker. However, the attacker can also be located anywhere in the world where a connection is provided to the Internet. According to the situation in FIG. 16, the attacker has taken control of four drone computers. These include the step 1 drone 210, step 2 drone 220, step 3 drone 230, and step 4 drone 240. All of these drone computers are in the control of the attacker. As previously discussed, during normal network connections a machine can only see information being transmitted from the immediately prior machine. For example, the target computer 250, which is the ultimate destination of the attack, only sees information being transmitted from the step 4 drone 240. Thus, the target computer 250 believes an attack is being launched from the step 4 drone 240. Likewise the step 4 drone 240 sees information related to the step 3 drone 230. Working backwards, the step 3 drone 230 sees an attack being initiated by the step 2 drone 220. The step 2 drone 220 sees an attack being initiated by the step 1 drone 210. The only computer within the connection link that knows the true address of the attacker 200 is the step 1 drone 210.

According to one or more embodiments of the present invention, the location of the attacker can be determined by analyzing the statistical distribution for data payloads transmitted through the multiple drone computers. The drone computers are connected to each other across a network via a number of service providers 260. Each service provider 260 maintains a connection record 270 that contains information regarding transmissions across the network. The connection record 270 can include, for example, the IP address 272 of the computer system transmitting information, the destination address 274 of the computer system where the information will be delivered, and the actual information 276 being delivered. In order to minimize the amount of information contained in the connection record, a statistical distribution can be generated for each data payload 276 that is transmitted. Thus, the statistical distribution can be configured such that it is stored within a short, for example 256 byte string, as previously discussed with respect various embodiments of the invention. This allows the service provider 260 to capture and store information regarding the vast number of transmissions passing through, without wasting storage space. As will be discussed in greater detail below, the information maintained by the service provider can be used to trace back the physical location of the attacker initiating the attack on the target machine. In addition, the statistical distribution can be generated for the entire connection record 270, or only a portion thereof.

Figure 19:
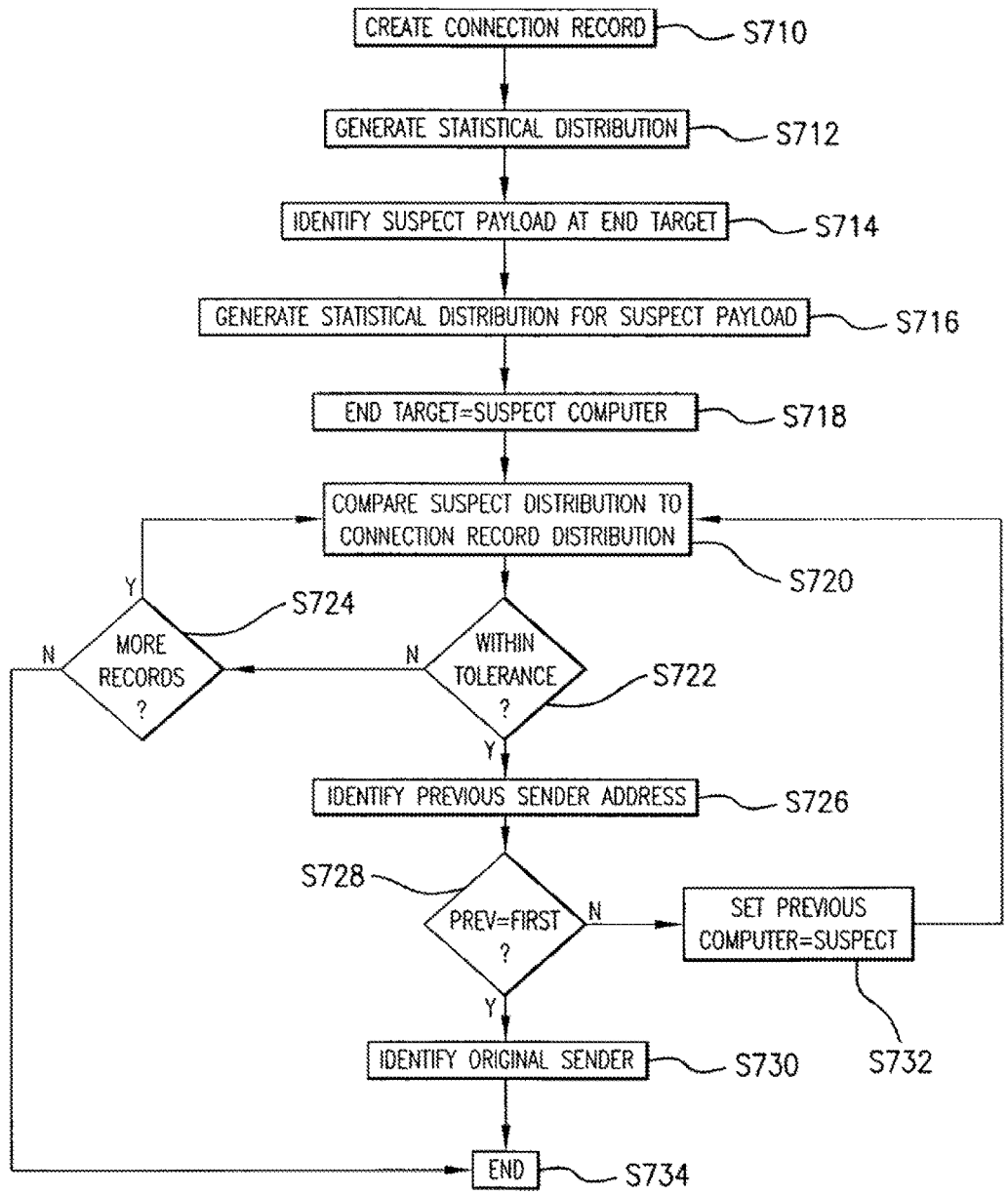
FIG. 19 is a flowchart illustrating the steps performed to trace the origin of a transmission according to one or more embodiments of the present invention.

FIG. 19 is a flowchart illustrating the steps performed to trace the origin of a transmitted message according to one or embodiments of the present invention. At step S710, connection records are created by the service provider. As previously discussed, the connection records can include, for example, an address of a previous computer system, a data payload, and an address for a subsequent computer system. At step S712, the connection records are examined, and statistical distributions are generated for data contained in each connection record. At step S714, a suspect payload is identified at an end target computer. More particularly, the suspect data payload can correspond to, for example, a malicious program that was used to either infect or initiate an attack on the target computer system. At step S716, a statistical distribution is generated for the suspect data payload. At step S718, the end target computer is designated as a suspect computer.

At step S720, the statistical distribution for the suspect data payload is compared to the statistical distributions of data payloads generated at step S712. At step S722, it is determined whether the distance of the suspect data payload distribution is within the tolerance threshold to the current connection record's distribution. If it is within the tolerance, then a match can be identified. If the statistical distribution for the suspect payload is not within the tolerance, then at step S724, it is determined whether there are additional connection records. If there are additional connection records, then control returns to step S720 where a comparison is made to the next connection record. If there are no more connection records then the process would end. However, if the statistical distribution for the suspect payload is within the tolerance, then at step S726, the identity of the previous sender is identified. This can be done, for example, by examining the connection record from which the distribution was generated. Within the connection records the address of the sender and destination computer systems are identified. Thus, the suspect computer system would be the destination address and the previous sender's address would be identified.

At step S728, it is determined whether the previous computer system is the original sender of the transmission. If the previous computer system is the original sender of the transmission, then the identity of the original sender is obtained and the process ends. However, if the previous sender's address does not correspond to the original sender of the transmission, then control passes the step S732. The previous computer is designated as the suspect computer. Control then returns to step S720 where the statistical distribution for the suspect payload is compared to the statistical distribution for connection records stored by the newly designated suspect computer. The process can repeat backwards through multiple computer systems until the original sender of the transmission is identified.

The anomaly detection system of the present invention can also be implemented on computers and servers using various operating systems such the Windows line of operating systems, Linux, MacOS, etc. The necessary program code can also be produced using any programming language such as C++, C#, Java, etc.

The many features and advantages of the invention are apparent from the detailed specification, and thus, the appended claims are intended to cover all such features and advantages which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A method of tracing the location of an origin computer system that initially transmits a suspect data payload across a computer network to an end target computer system, the method comprising:
 retrieving, using a hardware processor, a connection record that contains transmission information between a first computer system across the computer network;
 generating, using the hardware processor, a byte value statistical distribution of data contained in a data payload corresponding to the connection record;
 determining, using the hardware processor, a first distance between the byte value statistical distribution of data contained in the data payload and a model distribution representative of normal payloads transmitted across the computer network;
 identifying, using the hardware processor, the data payload as a suspect data payload based on the calculated distance;
 designating, using the hardware processor, the first computer system as a suspect computer system in response to identifying the suspect data payload;
 determining, using the hardware processor, that a second distance between the byte value statistical distribution and another connection record distribution falls within a given tolerance; and
 designating, using the hardware processor, at least a second computer system associated with the another connection record as the suspect computer system in response to determining that the second distance between the byte value statistical distribution and another connection record distribution falls within the given tolerance.

2. The method of claim 1, further comprising selecting the model distribution from a plurality of model distributions based at least in part on a length of the data contained in the data payload.

3. The method of claim 1, wherein the byte value statistical distribution of the data contained in the data payload is a rank ordered byte frequency count of the data contained in the data payload.

4. The method of claim 1, further comprising determining that the model distribution is similar to the byte value statistical distribution of the data contained in the data payload by:
 measuring a distance metric between the model distribution and the byte value statistical distribution of the data contained in the data payload; and
 determining that the model distribution is similar to the byte value statistical distribution of the data contained in the data payload based at least in part on comparing the distance metric to the given tolerance.

5. The method of claim 4, wherein the distance metric is calculated based on a Mahalanobis distance between the model distribution and the byte value statistical distribution of the data contained in the data payload.

6. The method of claim 1, further comprising assigning different weight factors to selected byte values of the byte value statistical distribution of the data contained in the data payload.

7. The method of claim 6, wherein higher weight factors are assigned to byte values corresponding to operational codes of a computer system.

8. The method of claim 1, further comprising:
 determining address information associated with the another connection record distribution; and
 identifying the at least second computer system based on the address information associated with the another connection record distribution.

9. A system for tracing the location of an origin computer system that initially transmits a suspect data payload across a computer network to an end target computer system, the system comprising:
 a memory; and
 a hardware processor that, when executing computer executable instructions stored in the memory, is configured to:
  retrieve a connection record that contains transmission information between a first computer system across the computer network;
  generate a byte value statistical distribution of data contained in a data payload corresponding to the connection record;
  determine a first distance between the byte value statistical distribution of data contained in the data payload and a model distribution representative of normal payloads transmitted across the computer network;
  identify the data payload as a suspect data payload based on the calculated distance;
  designate the first computer system as a suspect computer system in response to identifying the suspect data payload;
  determine that a second distance between the byte value statistical distribution and another connection record distribution falls within a given tolerance; and designate at least a second computer system associated with the another connection record as the suspect computer system in response to determining that the second distance between the byte value statistical distribution and another connection record distribution falls within the given tolerance.

10. The system of claim 9, wherein the hardware processor is further configured to select the model distribution from a plurality of model distributions based at least in part on a length of the data contained in the data payload.

11. The system of claim 9, wherein the byte value statistical distribution of the data contained in the data payload is a rank ordered byte frequency count of the data contained in the data payload.

12. The system of claim 9, wherein the hardware processor is further configured to determine that the model distribution is similar to the byte value statistical distribution of the data contained in the data payload by:
   measuring a distance metric between the model distribution and the byte value statistical distribution of the data contained in the data payload; and
   determining that the model distribution is similar to the byte value statistical distribution of the data contained in the data payload based at least in part on comparing the distance metric to the given tolerance.

13. The system of claim 12, wherein the distance metric is calculated based on a Mahalanobis distance between the model distribution and the byte value statistical distribution of the data contained in the data payload.

14. The system of claim 9, wherein the hardware processor is further configured to assign different weight factors to selected byte values of the byte value statistical distribution of the data contained in the data payload.

15. The system of claim 14, wherein higher weight factors are assigned to byte values corresponding to operational codes of a computer system.

16. The system of claim 1, wherein the hardware processor is further configured to:
   determine address information associated with the another connection record distribution; and
   identify the at least second computer system based on the address information associated with the another connection record distribution.

17. A non-transitory computer-readable medium containing computer-executable instructions that, when executed by a processor, cause the processor to perform a method for tracing the location of an origin computer system that initially transmits a suspect data payload across a computer network to an end target computer system, the method comprising:
   retrieving, using a hardware processor, a connection record that contains transmission information between a first computer system across the computer network;
   generating, using the hardware processor, a byte value statistical distribution of data contained in a data payload corresponding to the connection record;
   determining, using the hardware processor, a first distance between the byte value statistical distribution of data contained in the data payload and a model distribution representative of normal payloads transmitted across the computer network;
   identifying, using the hardware processor, the data payload as a suspect data payload based on the calculated distance;
   designating, using the hardware processor, the first computer system as a suspect computer system in response to identifying the suspect data payload;
   determining, using the hardware processor, that a second distance between the byte value statistical distribution and another connection record distribution falls within a given tolerance; and
   designating, using the hardware processor, at least a second computer system associated with the another connection record as the suspect computer system in response to determining that the second distance between the byte value statistical distribution and another connection record distribution falls within the given tolerance.

* * * * *